United States Patent
Inaoka et al.

(10) Patent No.: US 7,320,378 B2
(45) Date of Patent: Jan. 22, 2008

(54) EXHAUST CONTROL APPARATUS FOR A VEHICLE, AND VEHICLE INCLUDING SAME

(75) Inventors: Hiroshi Inaoka, Saitama (JP);
Norihiko Sasaki, Saitama (JP);
Noritake Takami, Saitama (JP);
Hiroaki Tamai, Saitama (JP); Yuichi Moriyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 10/941,749

(22) Filed: Sep. 15, 2004

(65) Prior Publication Data

US 2005/0067211 A1   Mar. 31, 2005

(30) Foreign Application Priority Data

Sep. 30, 2003   (JP)   ............................. 2003-339789

(51) Int. Cl.
B62D 61/02   (2006.01)
(52) U.S. Cl. .................. 180/225; 180/309; 180/296
(58) Field of Classification Search ............... 180/225, 180/219, 309, 296; 60/324
See application file for complete search history.

(56) References Cited

U.S. PATENT DOCUMENTS

| 3,938,330 | A |   | 2/1976  | Nakajima et al. |
| 4,178,873 | A | * | 12/1979 | Bankstahl ................. 440/89 R |
| 4,522,029 | A | * | 6/1985  | Tomita et al. ................. 60/314 |
| 4,785,626 | A | * | 11/1988 | Shiraishi ....................... 60/313 |
| 4,795,420 | A | * | 1/1989  | Sakurai et al. ................. 60/313 |
| 4,817,374 | A | * | 4/1989  | Kitta ............................ 60/313 |
| 4,840,029 | A | * | 6/1989  | Sakurai et al. ................. 60/313 |
| 4,860,538 | A | * | 8/1989  | Takeuchi ....................... 60/313 |
| 4,869,063 | A | * | 9/1989  | Sakurai et al. ................. 60/313 |
| 4,896,504 | A | * | 1/1990  | Matsui ......................... 60/313 |
| 4,912,930 | A | * | 4/1990  | Ueda ............................ 60/313 |
| 4,939,898 | A | * | 7/1990  | Ichimura et al. ............... 60/274 |
| 4,999,999 | A | * | 3/1991  | Takahashi et al. ............. 60/313 |
| 5,216,883 | A | * | 6/1993  | Flugger ........................ 60/313 |
| 5,271,477 | A | * | 12/1993 | Gekka et al. ................. 180/219 |
| 5,630,571 | A | * | 5/1997  | Kipp et al. ................... 251/214 |
| 6,546,722 | B2* | | 4/2003 | Sagara et al. ................. 60/324 |

(Continued)

FOREIGN PATENT DOCUMENTS

JP   04-012114   1/1992

(Continued)

*Primary Examiner*—Jeff Restifo
(74) *Attorney, Agent, or Firm*—Carrier, Blackman & Associates, P.C.; William D. Blackman; Joseph P. Carrier

(57) ABSTRACT

An exhaust control apparatus for a motorcycle includes an exhaust collection pipe, which collects and combines exhaust gas from a plurality of exhaust pipes, and an exhaust valve. The exhaust valve is operatively attached to the collection pipe and controls flow of exhaust gas within the collection pipe. A pivot shaft of the exhaust valve is situated at an angle and is displaced from the centers of the exhaust pipes, such that the shaft is not aligned with the centers of the exhaust pipes. This arrangement of the pivot shaft provides a smooth, non-turbulent flow of exhaust gas, and reduces impedance to the flow of exhaust gas. The exhaust control apparatus may be mounted to reside within a recess formed in a motorcycle body frame, to reduce vehicle width.

22 Claims, 18 Drawing Sheets

U.S. PATENT DOCUMENTS

| | | | |
|---|---|---|---|
| 6,655,134 B2 * | 12/2003 | Nakayasu et al. | 60/324 |
| 6,761,239 B2 * | 7/2004 | Kawamoto | 180/219 |
| 6,772,588 B2 * | 8/2004 | Yamada et al. | 60/313 |
| 2002/0050415 A1 | 5/2002 | Kawamoto | |
| 2005/0039448 A1 * | 2/2005 | Terashima | 60/323 |
| 2005/0056010 A1 * | 3/2005 | Momosaki et al. | 60/312 |
| 2005/0081516 A1 * | 4/2005 | Inaoka et al. | 60/324 |

FOREIGN PATENT DOCUMENTS

| | | |
|---|---|---|
| JP | 145732 | 6/1995 |

* cited by examiner

FIGURE 13 (a)
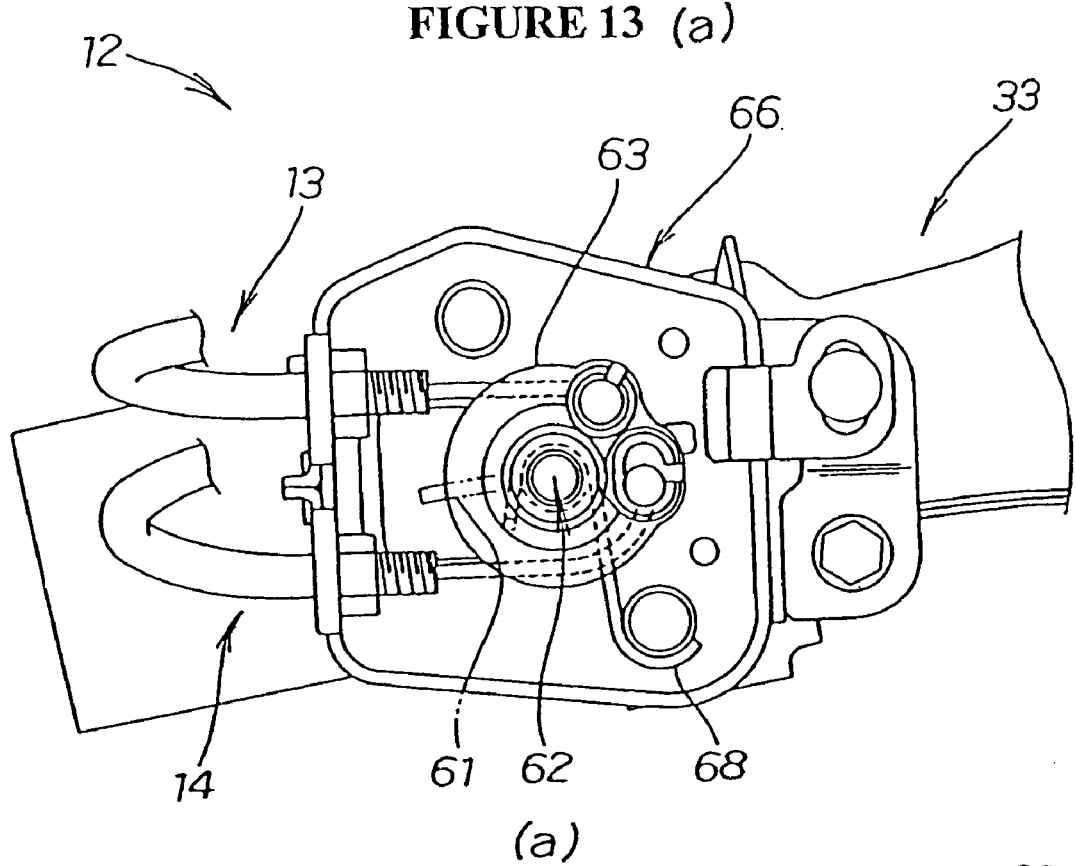
(a)
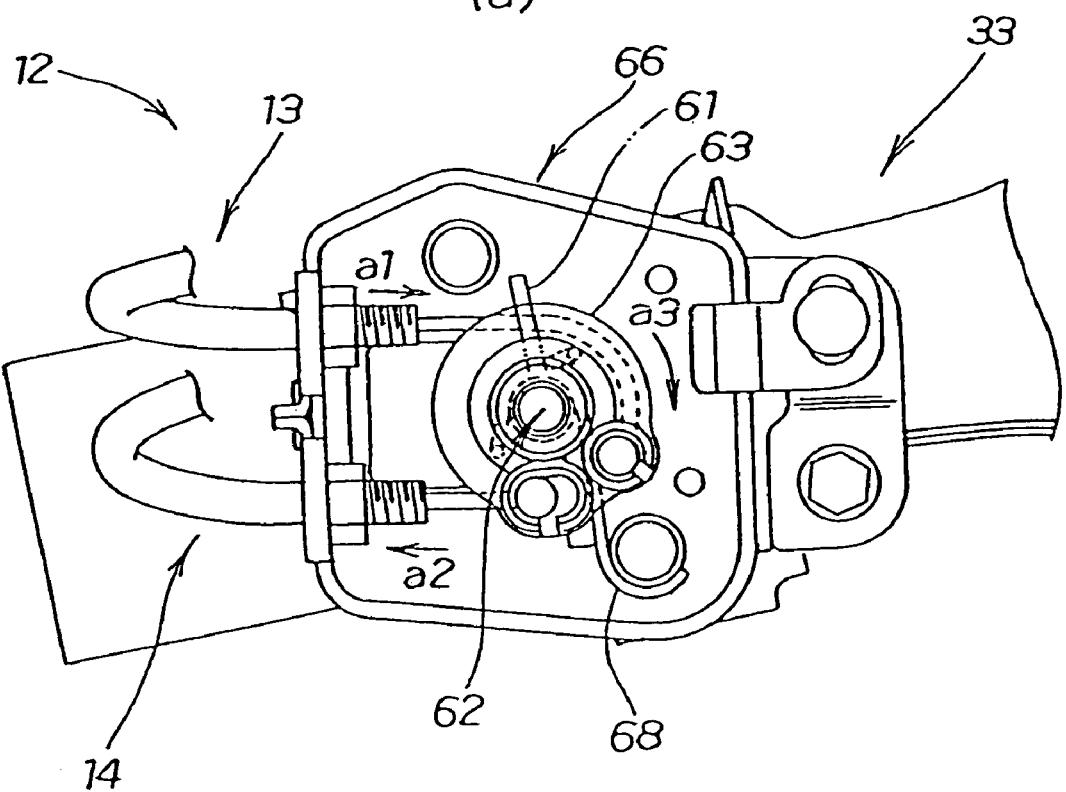
FIGURE 13 (b)

PRIOR ART

EXHAUST CONTROL APPARATUS FOR A VEHICLE, AND VEHICLE INCLUDING SAME

CROSS-REFERENCE TO RELATED APPLICATIONS

The present invention claims priority under 35 USC 119 based on Japanese Patent Application No. 2003-339789, filed Sep. 30, 2003.

BACKGROUND OF THE INVENTION

1. Field of the Invention

The present invention relates to vehicle exhaust systems. More particularly, the present invention relates to an exhaust control apparatus for use on a motorcycle, in which the apparatus is operable to ensure a smooth flow of an exhaust gas.

2. Description of the Background Art

Exhaust systems are conventionally used with virtually all types of vehicles, to dampen and muffle sound made by the engine. A number of flow control valves are known for controlling exhaust flow through an exhaust pipe.

One example of a known motorcycle exhaust control apparatus which mounts a valve in an exhaust passage of an engine exhaust system, and uses the valve to control a flow rate of exhaust gas in the exhaust passage, is disclosed in Japanese Unexamined Patent Publication Hei7 (1995)-145732. The motorcycle exhaust control apparatus described in this reference is somewhat effective, provided that the valve is mounted on the exhaust pipe which constitutes an exhaust passage, and the valve can be opened or closed. FIG. 18 of the accompanying drawings is a reproduction of FIG. 2 in Japanese Unexamined Patent Publication Hei7 (1995)-145732, wherein the reference numbers from the original publication are maintained.

As shown in FIG. 18, the motorcycle exhaust control apparatus described in Japanese Unexamined Patent Publication Hei7 (1995)-145732 includes an exhaust valve 20, which allows a shaft 22 to penetrate a cylindrical surface of an exhaust pipe 21. The exhaust valve 20 includes a throttle plate 23 attached to the shaft 22 for controlling an exhaust flow rate. The shaft 22 penetrates the approximate center of the pipe 21, extending along a line corresponding to the diameter of the pipe 21.

However, in the motorcycle exhaust control apparatus described in Japanese Unexamined Patent Publication Hei7 (1995)-145732, since the shaft 22, extends across the pipe 21 at the approximate center of the pipe 21, exhaust gas which flows through the approximate center of the pipe 21 is forced to flow in a roundabout route around the shaft 22. Hence, a turbulent flow is generated inside of the pipe 21, with the result that that the exhaust efficiency is lowered.

Therefore, a need still exists for an exhaust control apparatus for a motorcycle which can ensure a smooth flow of an exhaust gas when an exhaust valve 20 is arranged in an exhaust passage including an exhaust pipe.

SUMMARY OF THE INVENTION

It is an object of the present invention to provide a motorcycle exhaust control apparatus which can enhance the exhaust efficiency and can enhance the performance of exhaust control by ensuring a smooth flow of an exhaust gas which flows along the centerline of the exhaust pipe by improved arrangement of an exhaust valve within an exhaust pipe.

The first aspect of the invention is directed to a motorcycle exhaust control apparatus which includes a collection pipe which collects a plurality of exhaust pipes and an exhaust valve which controls a flow rate of an exhaust gas to the collection pipe, wherein the improvement is characterized in that a shaft of the exhaust valve is arranged at a position away from the centers of the plurality of exhaust pipes. It is possible to ensure a smooth flow of the exhaust pipes and to enhance the discharge efficiency of the exhaust gas by arranging the exhaust valve such that the interruption of the flow of the exhaust gas by the exhaust valve is reduced.

Accordingly, the exhaust valve, which controls a flow rate of the exhaust gas, is provided within the collection pipe, and the shaft of the exhaust valve is arranged at a position away from the centers of the plurality of exhaust pipes. By providing the exhaust valve within the collection pipe and by arranging the shaft of the exhaust valve at a position away from the centers of the plurality of exhaust pipes, the smooth flow of the exhaust gas is ensured and the exhaust efficiency is enhanced.

Further, the a second aspect of the invention is characterized in that when the plurality of exhaust pipes are formed of two pipes, the shaft of the exhaust valve is inclined within a range of 35 to 55 degrees with respect to a straight line which connects the centers of two exhaust pipes. By imparting the inclination to the shaft of the exhaust valve within a range of 35 to 55 degrees to the straight line which connects the centers of two exhaust pipes, a desired height of the motorcycle above the ground is ensured, and the position of the exhaust control apparatus relative to the motorcycle body is accommodated, even at a maximum a bank angle.

According to the first aspect of the invention, the exhaust valve, which controls a flow rate of the exhaust gas, is provided within the collection pipe, and the shaft of the exhaust valve is arranged at a position away from the centers of the plurality of exhaust pipes. Therefore, it is possible to ensure the smooth flow of the exhaust gas and to enhance the exhaust efficiency. As a result, it is possible to obtain the advantageous effect that the ability of the exhaust control apparatus to control the exhaust gas is enhanced.

According to a second aspect of the invention, when the plurality of exhaust pipes are formed of two pipes, the shaft of the exhaust valve is inclined within a range of 35 to 55 degrees with respect to a straight line which connects the centers of two exhaust pipes. Therefore, it is possible to ensure desired a height of the motorcycle above the ground and easily accommodate the exhaust control apparatus upon the motorcycle within a bank angle. As a result, it is possible to obtain increased freedom in placement of the exhaust control apparatus in the overall design of the motorcycle.

For a more complete understanding of the present invention, the reader is referred to the detailed description section below, which should be read in conjunction with the accompanying drawings. Throughout the following detailed description and in the drawings, like numbers refer to like parts.

BRIEF DESCRIPTION OF THE DRAWINGS

FIG. 13 is an explanatory view for explaining the manner of operation of the exhaust control apparatus of the motorcycle of FIG. 1 in which FIG. 13a shows the operational wires acting to place the valve in an open state, and FIG. 13b shows the operational wires acting to place the valve in a closed state.

DETAILED DESCRIPTION OF THE INVENTION

Figure 1:
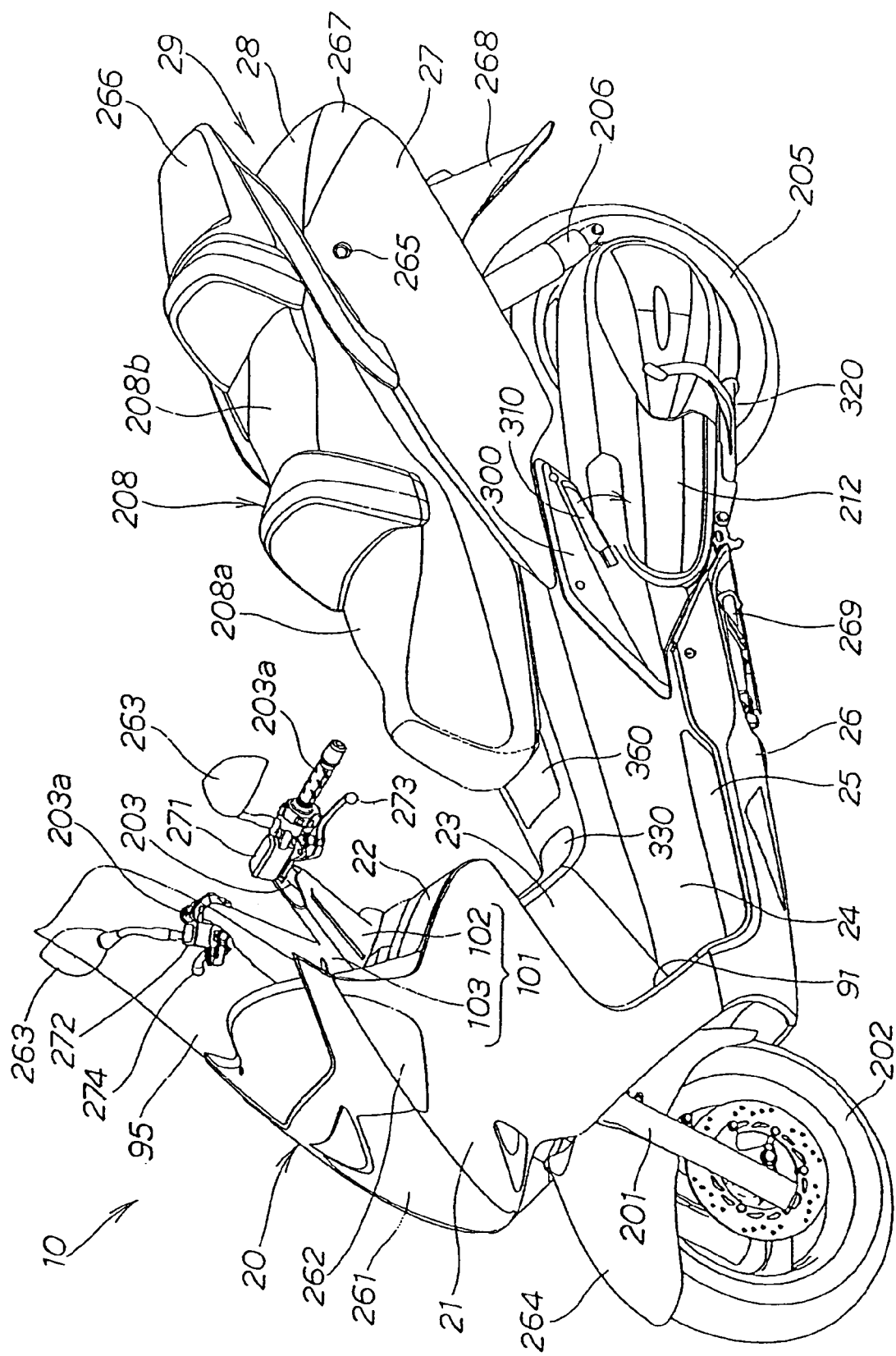
FIG. 1 is a left-side perspective view of a motorcycle having an exhaust control apparatus according to a selected illustrative embodiment of the present invention mounted thereon.

A selected illustrative embodiment of the present invention, installed on a vehicle, will now be described in conjunction with attached drawings. FIG. 1 is a left-side perspective view of a motorcycle 10 which employs an exhaust control apparatus according to a selected illustrative embodiment of the present invention, wherein the motorcycle 10 is a scooter-type vehicle having a low-floor-type floor 25.

A vehicle body cover 20 which covers the whole vehicle body frame of the motorcycle 10 includes a front cowl 21 which covers a front portion of the vehicle body frame described later and an upper portion of a front wheel. An upper cover 22 covers an upper opening formed in the front cowl 21, an inner cover 23 covers a rear portion of the front cowl 21, and a center cover 24 extends rearwardly from a rear end of the inner cover 23 and covers the longitudinal center of the vehicle body frame. The low-floor-type floor 25 extends outwardly from an outer periphery of a lower end of the center cover 24 and allows the placing of a driver's feet thereon. A floor skirt 26 extends downwardly from an outer periphery of the low-floor-type floor 25, and rear side covers 27, 27 (the rear side cover 27 at the right side not shown in the drawing) extend rearwardly from the center cover 24 and cover the rear side portion of the vehicle body frame. Rear cover 28 extends rearwardly from the rear end of the rear side covers 27, 27 and covers the rear side portion of the vehicle body frame. Here, the rear side covers 27, 27 and the rear cover 28 constitute a seat cowl 29.

The front cowl 21 includes a transparent wind screen 95 on an upper portion thereof. The inner cover 23 includes a leg shield 91 for covering a front portion of a driver's legs. Further, the motorcycle 10 includes a handle 203 at a front portion of the body and also includes a seat 208 and a step holder 300 on a rear portion of the body.

The handle 203 is a product of a type similar to a so-called chopper type handle in which grips 203a, 203a are arranged at a relatively high position and are retracted in the rearward direction. The handle 203 is covered with a handle cover 101. The handle cover 101 is formed of a lower handle cover 102 which covers left and right lower portions of the handle 203 and an upper handle cover 103 which covers an upper portion of the handle 203.

The seat 208 is of a double seat type which is formed of a front seat portion 208a on which a driver sits and a rear seat portion 208b on which an occupant sits. The step holder 300 is arranged close to the rear portion of the center cover 24 and is provided for mounting a pillion step (an occupant step) 310 thereon such that the pillion step 310 can be stored in or exposed from the step holder 300. Here, the pillion step 310 is served for allowing an occupant to put his/her foot thereon.

In the drawing, reference numeral 261 indicates a head lamp, reference numeral 262 indicates a blinker, reference numerals 263, 263 indicate mirrors, reference numeral 264 indicates a front fender, and reference numeral 265 indicates a lock for seat lock. Further, reference numeral 266 indicates a rear spoiler, reference numeral 267 indicates a tail lamp, reference numeral 268 indicates a rear fender, reference numeral 269 indicates a sub stand, reference numeral 320 indicates a main stand, reference numeral 330 indicates a lid for oil supply, and reference numeral 360 indicates a side lid for inspection. Here, reference numerals 271, 272 are master cylinders and generate a fluid pressure for braking with the manipulation of brake levers 273, 274.

Figure 2:
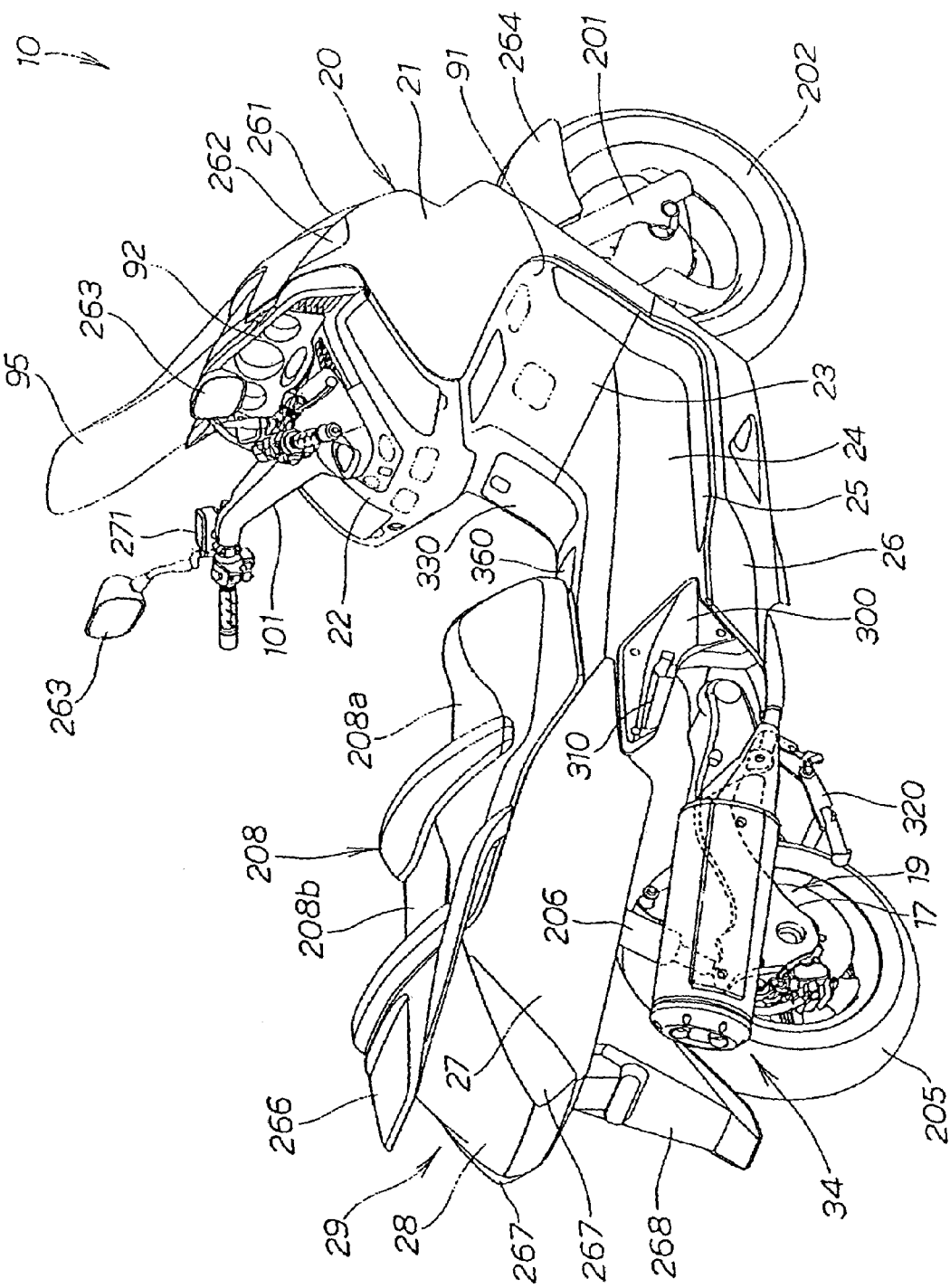
FIG. 2 is a right-side perspective view of the motorcycle of FIG. 1.

FIG. 2 is a right-side perspective view of the motorcycle of FIG. 1. The drawing shows that a meter panel 92 is provided above the front cowl 21 and, at the same time, behind a wind screen 95. As clearly understood from the explanation made heretofore, the wind screen 95, the leg shield 91 and the meter panel 92 are provided at the front portion of the body. Further, this drawing also shows that the step holder 300, which includes the pillion step 310, is also arranged at the right side of the motorcycle 10. Reference numeral 34 indicates an exhaust muffler.

Figure 3:
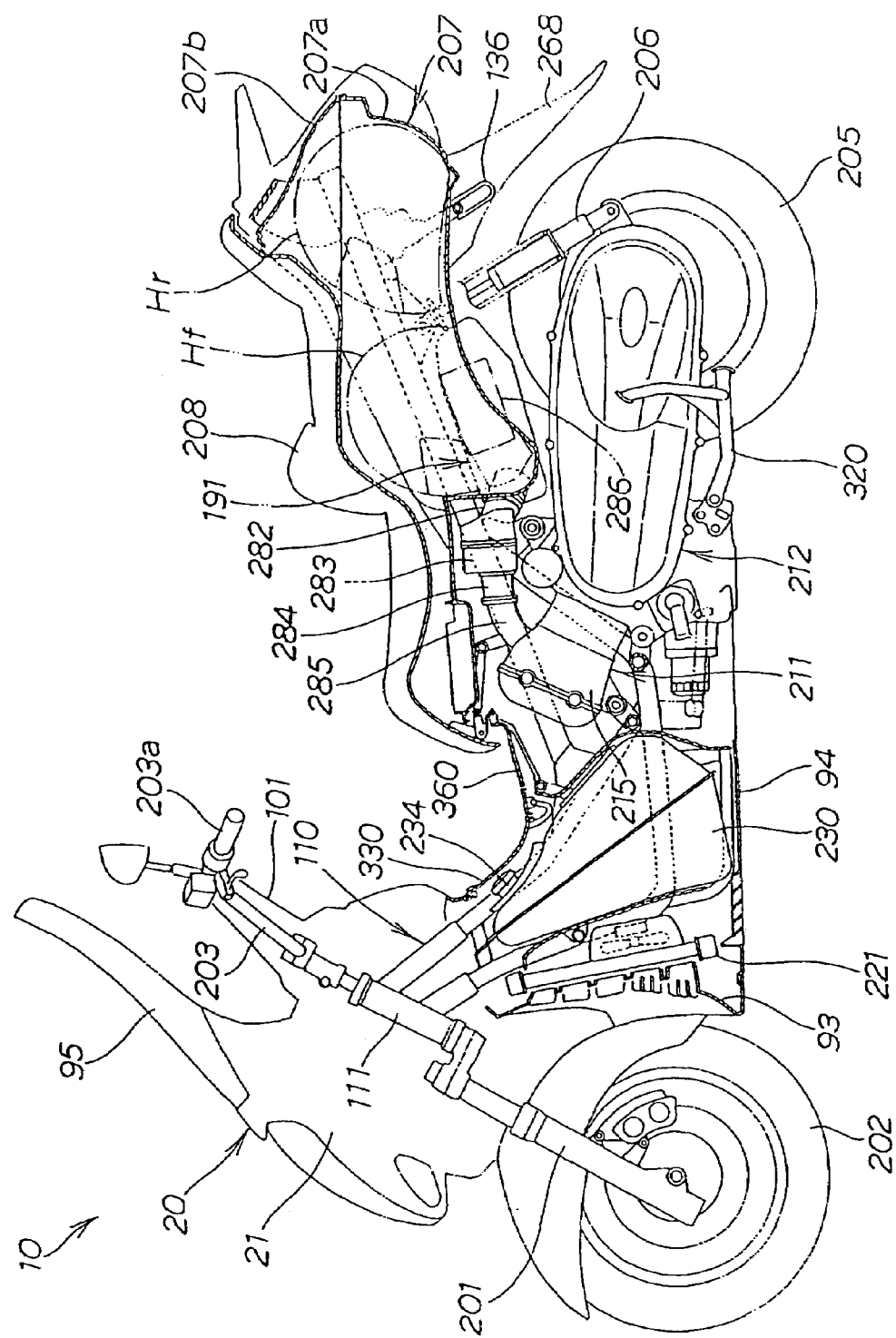
FIG. 3 is a side cross-sectional view of the motorcycle of FIG. 1.

FIG. 3 is a side cross-sectional view of the motorcycle of FIGS. 1-2. The motorcycle 10 is a scooter-type vehicle and includes, as the main components thereof, a vehicle body frame 110, a front fork 201 which is mounted on the head pipe 111 of the vehicle body frame 110 in such a manner that the front fork 201 can swing in the left-and-right direction, a front wheel 202 which is mounted on the front fork 201, and the above-mentioned handle 203 which is connected to the front fork 201. It further includes an engine 211 which is mounted on the rear portion of the vehicle body frame 110, a power transmission mechanism 212 which is swingable in the upward-and-downward direction about the crankshaft of the engine 211, and a rear wheel 205 which is mounted on a rear portion of the power transmission mechanism 212. A rear shock absorber unit 206 suspends a rear end portion of the power transmission mechanism 212 on the vehicle body frame 110, an accommodation box 207 is mounted on the rear upper portion of the vehicle body frame 110, and the above-mentioned seat 208 is arranged on the accommodation box 207 in such a manner that the seat 208 can be opened or closed.

The front fork 201 is a U-shaped fork arranged below the head pipe 111. An upper portion of the front fork 201 and the head pipe 111 are covered by the front cowl 21.

The engine 211 is a water-cooled two-cylinder engine which is substantially horizontally arranged, wherein the engine 211 has two left and right cylinder heads 215 which are slightly inclined in the frontward and upward direction. The power transmission mechanism 212 is a belt converter variable-speed drive mechanism equipped with a centrifugal clutch and transmits the power of the engine 211 to the back wheel 205.

The accommodation box 207 is a long and narrow box that extends in the fore-and-aft direction of the body such that the accommodation box 207 can accommodate two helmets Hf, Hr in front and rear portions thereof. That is, the accommodation box 207 is formed of a lower box 207a, and an upper box 207b which is overlaps a rear upper portion of the lower box 207a.

In the drawing, reference numeral 93 indicates a front lower cover, reference numeral 94 indicates an under cover, reference numeral 191 indicates an air cleaner, and reference numeral 221 indicates a radiator. Also in the drawing, reference numeral 230 indicates a fuel tank, reference numeral 234 indicates a refueling opening, reference numeral 282 indicates a connecting tube, reference numeral 283 indicates an air chamber, reference numeral 284 indicates a throttle valve, reference numeral 285 indicates an inlet pipe and reference numeral 286 indicates a battery.

Figure 4:
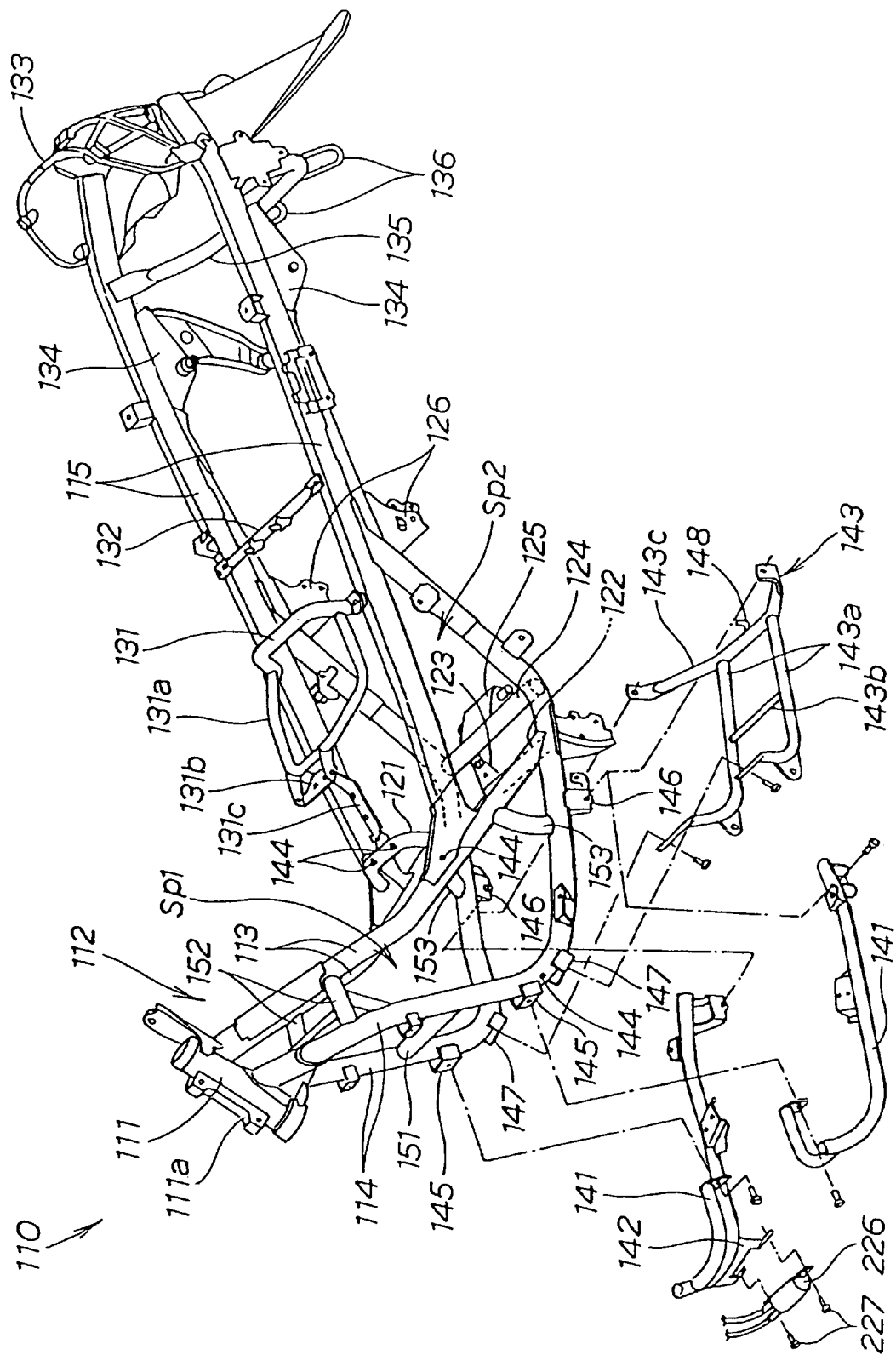
FIG. 4 is a perspective view of a vehicle body frame of the motorcycle of FIG. 1.

FIG. 4 is a perspective view of the vehicle body frame 110 of the motorcycle 10. The vehicle body frame 110 is a double cradle-type integrated frame which joins by welding a front frame 112, which is contiguously formed with the head pipe 111, and a pair of left and right seat rails (rear frames) 115, 115 which are extended rearwardly from a rear portion of the front frame 112. The head pipe 111 includes a bracket 111a for cowl securement purposes.

The front frame 112 is configured as follows. A pair of left and right upper frames 113, 113 extend downwardly and rearwardly from the head pipe 111. A pair of left and right down tubes 114, 114 extend downwardly from the head pipe 111 below the pair of upper frames 113, 113. The lower ends of the pair of down tubes 114, 114 extend rearwardly and are connected to lower ends of the pair of upper frames 113, 113 and, thereafter, extend in the rearward and upward direction. The front frame 112 is constructed so as to define a space portion Sp1. Space portion Sp1 has an approximately triangular shape as viewed from the side and is surrounded by the pair of upper frames 113, 113 and the pair of down tubes 114, 114.

A first cross member 121 is positioned between a front end of the left rear frame 115 and a front end of the right rear frame 115. First cross member 121 is a gate type as viewed from the front. A second cross member 122 is positioned between a lower end of the left upper frame 113 and a lower end of the right upper frame 113. Further, a first engine bracket 123 is connected to the second cross member 122 at the center position thereof in the vehicle width direction.

A third cross member 124 is positioned between a rear end portion of a horizontal portion of the left down tube 114 and a rear end portion of the horizontal portion of the right down tube 114. A second engine bracket 125 is joined to the third cross member 124 at a center position thereof in the vehicle width direction. Further, left and right third brackets for engine 126, 126 are joined to rear ends of the left and right down tubes 114, 114.

A pair of left and right rear frames 115, 115 have first ends thereof connected to longitudinal mid portions of the pair of left and right upper frames 113, 113, and have second ends thereof extended rearwardly The pair of left and right rear frames 115, 115 have vertically-elongated cross sectional shapes. Here, "vertically-elongated cross-sectional shape" means a cross-sectional shape having a vertical size set larger than a lateral size. To be more specific, the rear frames 115, 115 are formed of a quadrangular pipe having vertically-elongated rectangular cross section.

In the drawing, reference numeral 131a indicates a U-shaped stay, reference numeral 131b indicates a seat hinge support portion, and reference numeral 131c indicates an extending member. In addition, reference numeral 141 indicates a floor support stay, reference numeral 143 indicates an under frame, reference numeral 144 indicates a pin with a head, and reference numeral 142 indicates a stay. Reference numerals 143a, 143a indicate left and right side members, reference numeral 143b indicates a center cross member, reference numeral 143c indicates a rear cross member, and reference numerals 145 to 147 indicate brackets. Reference numeral 148 indicates a hook, reference numeral 151 indicates a front cross member, reference numerals 152, 153 indicate reinforcement members, reference numeral 226 indicates an ignition coil for engine and reference numeral 227 indicates a bolt.

Figure 5:
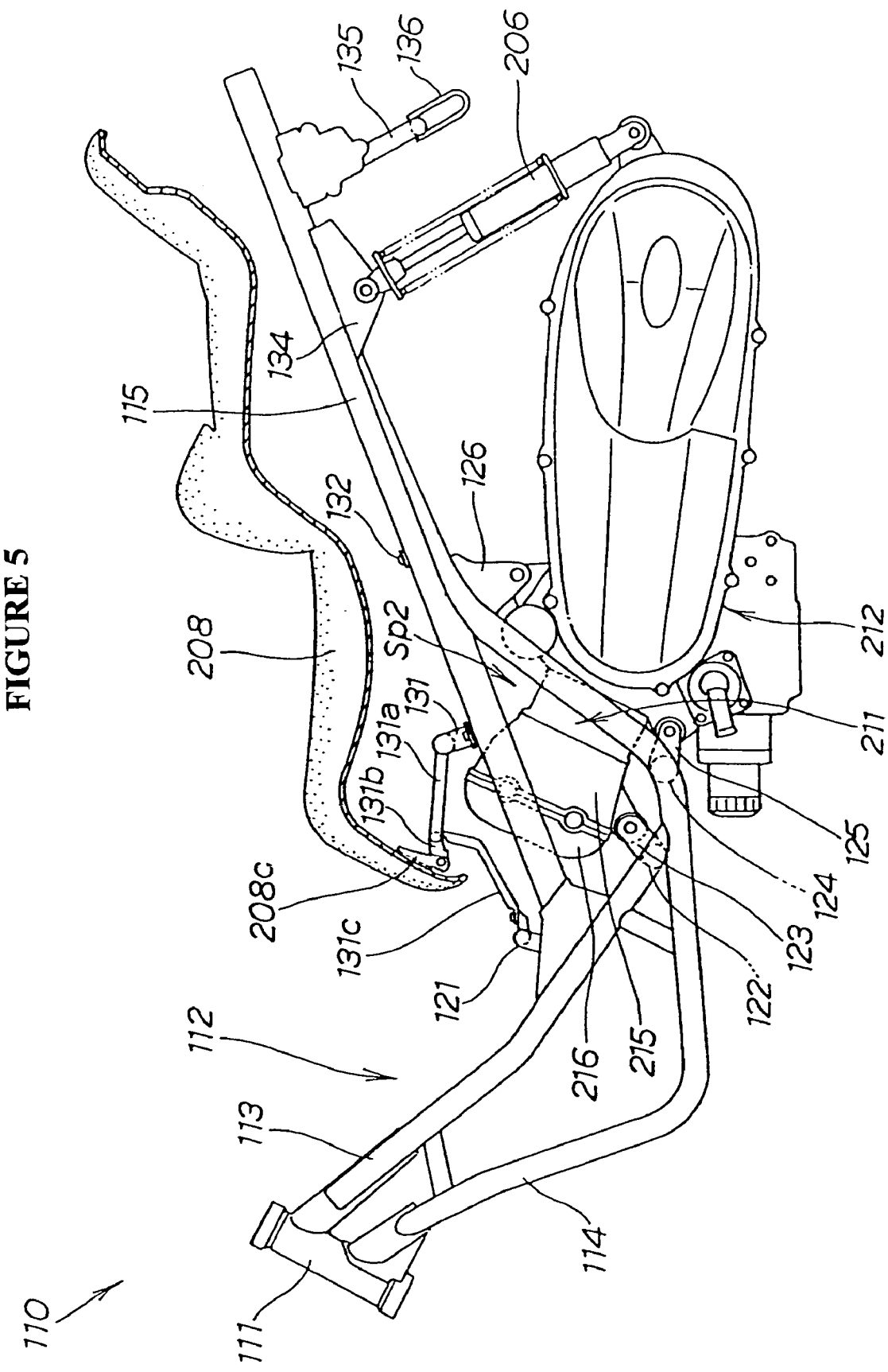
FIG. 5 is a left side view of an engine, a power transmission mechanism and a seat mounted within the vehicle body frame of FIG. 4.

FIG. 5 is a left side view of the engine, the power transmission mechanism and the seat of the motorcycle 10. This figure shows that the engine 211 and the power transmission mechanism 212 are arranged behind the front frame 112 and below a pair of rear frames 115, 115. The engine 211 is mounted in the vicinity of the connection portion of the front frame 112 and the left and right rear frames 115, 115 (only left rear frame 115 shown in the drawing).

To be more specific, behind the front frame 112, a space portion Sp2 is formed having an approximately triangular shape as viewed from the side and is surrounded by the pair of upper frames 113, 113, the pair of down tubes 114, 114 and the pair of rear frames 115, 115. A cylinder head 215 and a head cover 216 of the engine 211 are arranged in the space portion Sp2. A front lower portion of the engine 211 is mounted on the first engine bracket 123, a rear lower portion of the engine 211 is mounted on the second engine bracket 125 and a rear upper portion of the engine 211 is mounted on the third engine brackets 126, 126. Here, front and middle rear cross members 131, 132 are arranged above the engine 211.

Further, this drawing shows a rear end portion of the power transmission mechanism 212 suspended on left and right shock absorber brackets 134, 134 by way of left and right rear shock absorber units 206, 206, and the front rear cross member 131 also serves as a member for supporting a seat hinge 208c of the open-and-close type seat 208.

That is, the vehicle body frame 110 of the scooter-type vehicle has the following construction: the pair of left and right rear frames 115, 115 (one rear frame 115 not shown in the drawing) extend rearwardly from the rear section of the front frame 112 which is contiguously formed with the head pipe 111 and seat 208; the rear shock absorber units 206, 206 (one rear shock absorber unit 206 not shown in the drawing) are supported on the rear frames 115; the engine 211 is arranged behind the front frame 112 and below the pair of rear frames 115, 115; and the cross members 131 to 133 (see FIG. 4 with respect to symbol 133) are replaceably positioned between the pair of left and right rear frames 115, 115 about the engine 211.

Figure 6:
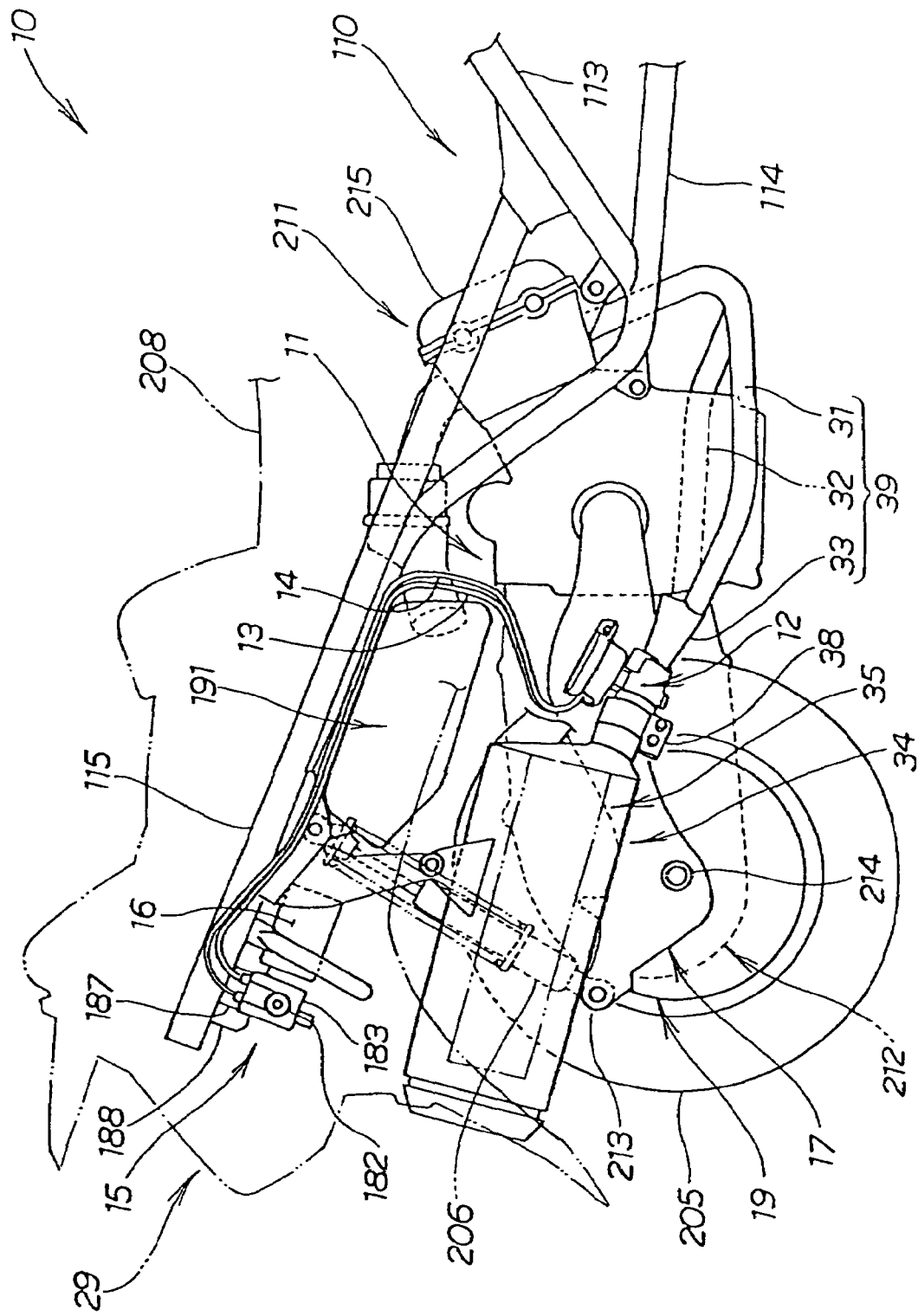
FIG. 6 is a side view of the rear portion of the motorcycle of FIG. 1 showing an exhaust control apparatus according to the present invention mounted to the exhaust system.

The exhaust control apparatus 11 of the motorcycle is explained in detail hereinafter. FIG. 6 is a side view of the exhaust control apparatus 11 according to the selected illustrative embodiment of the present invention, shown installed on the motorcycle 10. The exhaust control apparatus 11 is provided for controlling the flow of an exhaust gas therethrough. The exhaust control apparatus 11 includes an exhaust valve 12 which is attached to an exhaust pipe 39. The exhaust control apparatus 11 also includes two control cables 13, 14 which operate the exhaust valve 12. The exhaust control apparatus 11 also includes a servo motor 15 which drives these control cables 13, 14 and an electronic control unit (ECU) 16 which controls the flow rate of the exhaust gas by controlling operation of the servo motor 15. Generally, an ECU is an electric control apparatus which uses a computer to control vehicle components such as the engine, the automatic transmission, and the antilock brake system, and the like.

A rear shock absorber support arm 17 is positioned in the vicinity of the exhaust valve 12 and is integrally attached to the previously-mentioned power transmission mechanism 212 for supporting the right rear shock absorber unit 206 and, at the same time, for rotatably supporting the rear wheel 205. The rear shock absorber support arm 17 includes a shock absorber support portion 213 which supports the rear shock absorber unit 206, a rear wheel support portion 214 which supports the rear wheel 205, and a recessed portion 18 which is recessed toward the center of the vehicle body. A swing arm (a rear fork) 19 which rotatably supports the rear wheel 205 is constituted of the power transmission mechanism 212 and the rear shock absorber support arm 17.

Figure 7:
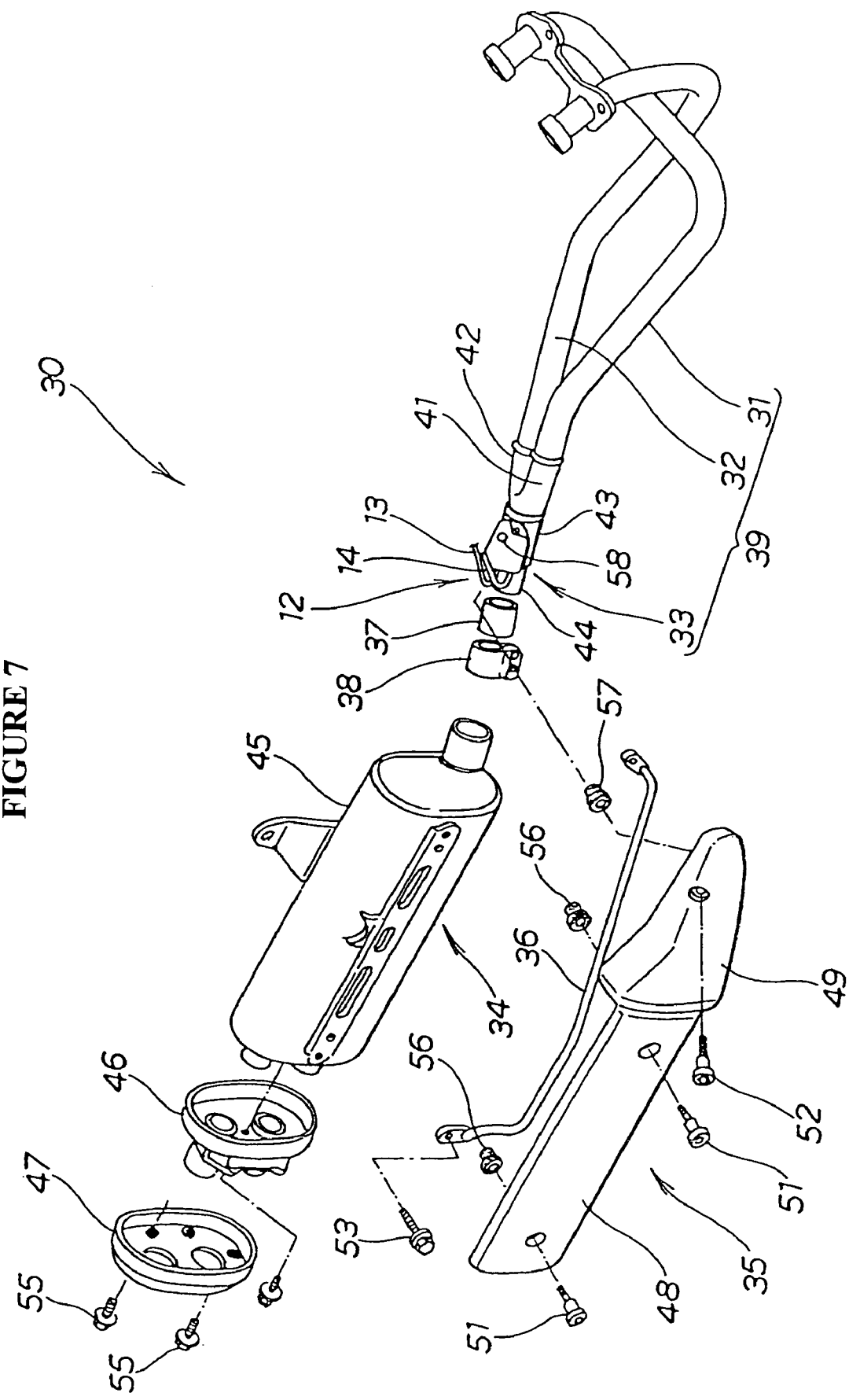
FIG. 7 is an exploded perspective view of the exhaust system of FIG. 6, including the exhaust control apparatus according to the present invention mounted thereon.

FIG. 7 is an exploded perspective view of the exhaust system 30 of the motorcycle 10, including the exhaust control apparatus 11 of the present invention. The exhaust system 30 includes a first takedown pipe 31 and a second takedown pipe 32 which extend from the engine 211 (see FIG. 6). The exhaust system 30 also includes an exhaust collection pipe 33 which merges exhaust from these first and second pipes 31, 32 together. The exhaust system 30 also includes the control apparatus 11 hereof, as noted. The exhaust system 30 further includes a muffler 34 which is connected to the exhaust collection pipe 33, a muffler protector 35 which covers the muffler 34, a muffler guard 36 which protects the muffler 34, and a band 38 which fixes the muffler 34 to the exhaust collection pipe 33 by way of a gasket 37.

Generally, although the exhaust pipe means exhaust pipes which are connected to respective cylinders of the engine, in this specification, the exhaust pipe 39 means a pipe assembly which includes the first and second takedown pipes 31, 32 and the exhaust collection pipe 33.

The exhaust collection pipe 33 is formed of a first connection portion 41 to which the first takedown pipe 31 is connected, a second connection portion 42 to which the second takedown pipe 32 is connected, a valve mounting portion 43 which mounts the exhaust valve 12 thereon, and a connection portion 44 to which a muffler 34 is connected.

The muffler 34 includes a muffler body 45, a tail pipe assembly 46 which is mounted on the muffler body 45 and a tail cover 47 which covers the tail pipe assembly 46. The muffler protector 35 is made up of a protector body portion 48 which covers the side surface of the muffler body 45 and a cover portion 49 which is integrally extended from the protector body portion 48 to the front of the body and covers the exhaust valve 12.

In the drawing, reference numeral 51 indicates bolts which fix a protector body portion 48 to the muffler body 45 by way of elastic bushings 56, reference numeral 52 indicates a bolt which fixes the cover portion 49 to a mounting portion 58 of the exhaust valve 12 by way of an elastic bushing 57, and reference numeral 53 indicates a bolt which fixes the muffler guard 36 to the muffler body 45. Reference numeral 54 indicates a bolt which fixes the tail pipe assembly 46 to the muffler body 45 and reference numeral 55 indicates bolts which fix the tail cover 47 to the muffler body 45 by way of the tail pipe assembly 46.

The exhaust control apparatus 11 is constructed as follows. That is, in the motorcycle 10 (see FIG. 2) in which the engine 211 (see FIG. 6) is mounted on the vehicle body frame 110 (see FIG. 4), the exhaust pipe 39 is connected to the engine 211, the muffler 34 is mounted on the exhaust pipe 39, and the exhaust valve 12 controlling the flow rate of the exhaust gas is provided on the exhaust pipe 39, the muffler protector 35 is mounted on the muffler 34, the cover portion 49 is integrally extended from the muffler protector 35, and the exhaust valve 12 is covered with the cover portion 49.

The manufacturing cost of the motorcycle can be suppressed, for example, when the exhaust valve is covered with a cover or the like, particularly if the exhaust valve can be covered without increasing the number of parts by making use of existing parts. Accordingly, by integrally extending the cover portion 49 from the muffler protector 35 and by covering the exhaust valve 12 with the cover portion 49, the number of parts is reduced compared to a case in which the exhaust valve is covered with separate members. As a result, the manufacturing cost of the motorcycle 10 is reduced.

Further, by integrally extending the cover portion 49 from the muffler protector 35 and by covering the exhaust valve 12 with the cover portion 49, the design and the merchantability of the motorcycle 10 can be enhanced.

Further, by employing the mounting portion 58, which serves to mount the cover portion 49 to the exhaust valve 12, vibration of both the cover portion 49 and the exhaust valve 12 are stopped.

Figure 8:
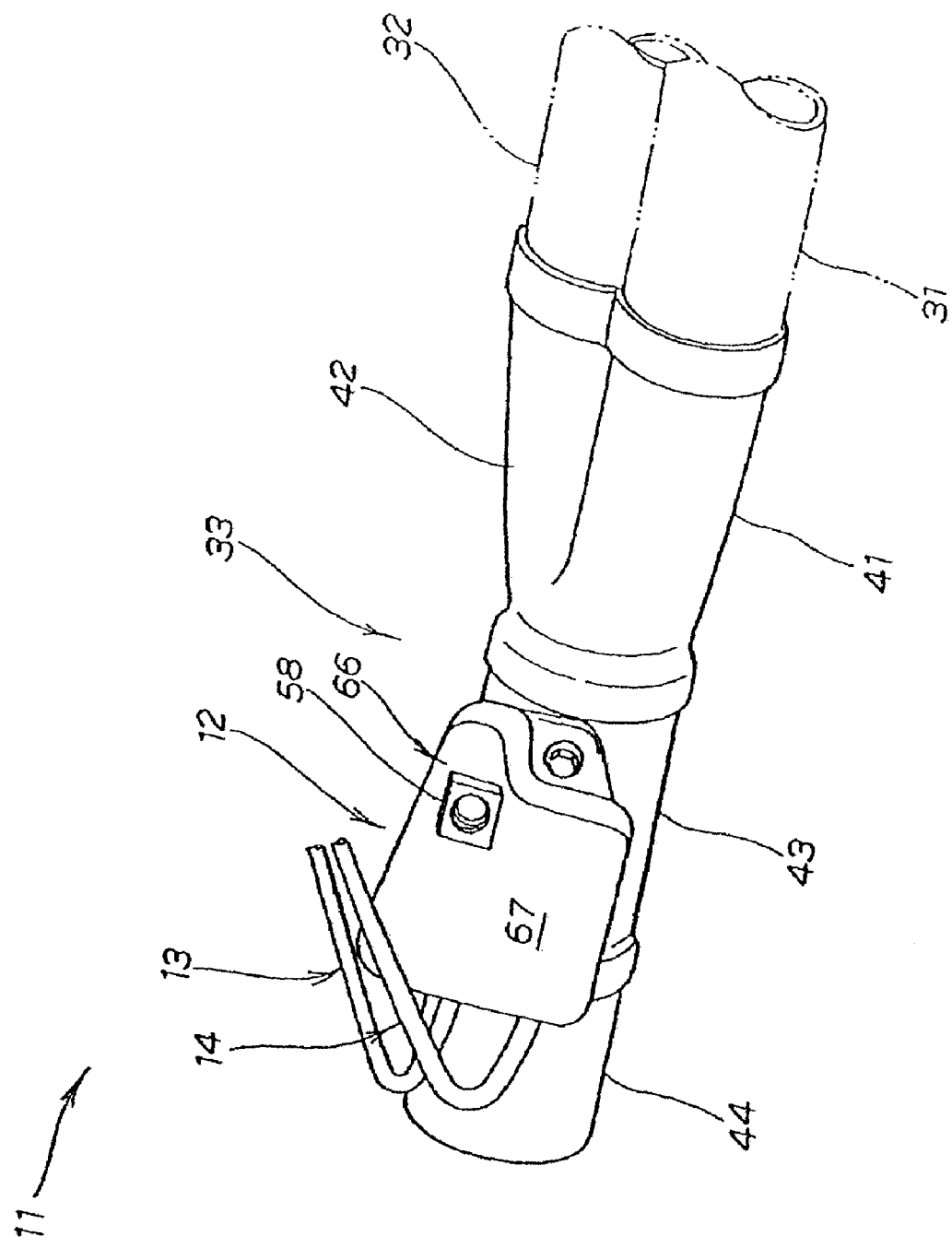
FIG. 8 is a detail perspective view of an exhaust control apparatus of the motorcycle of FIG. 1.
Figure 9:
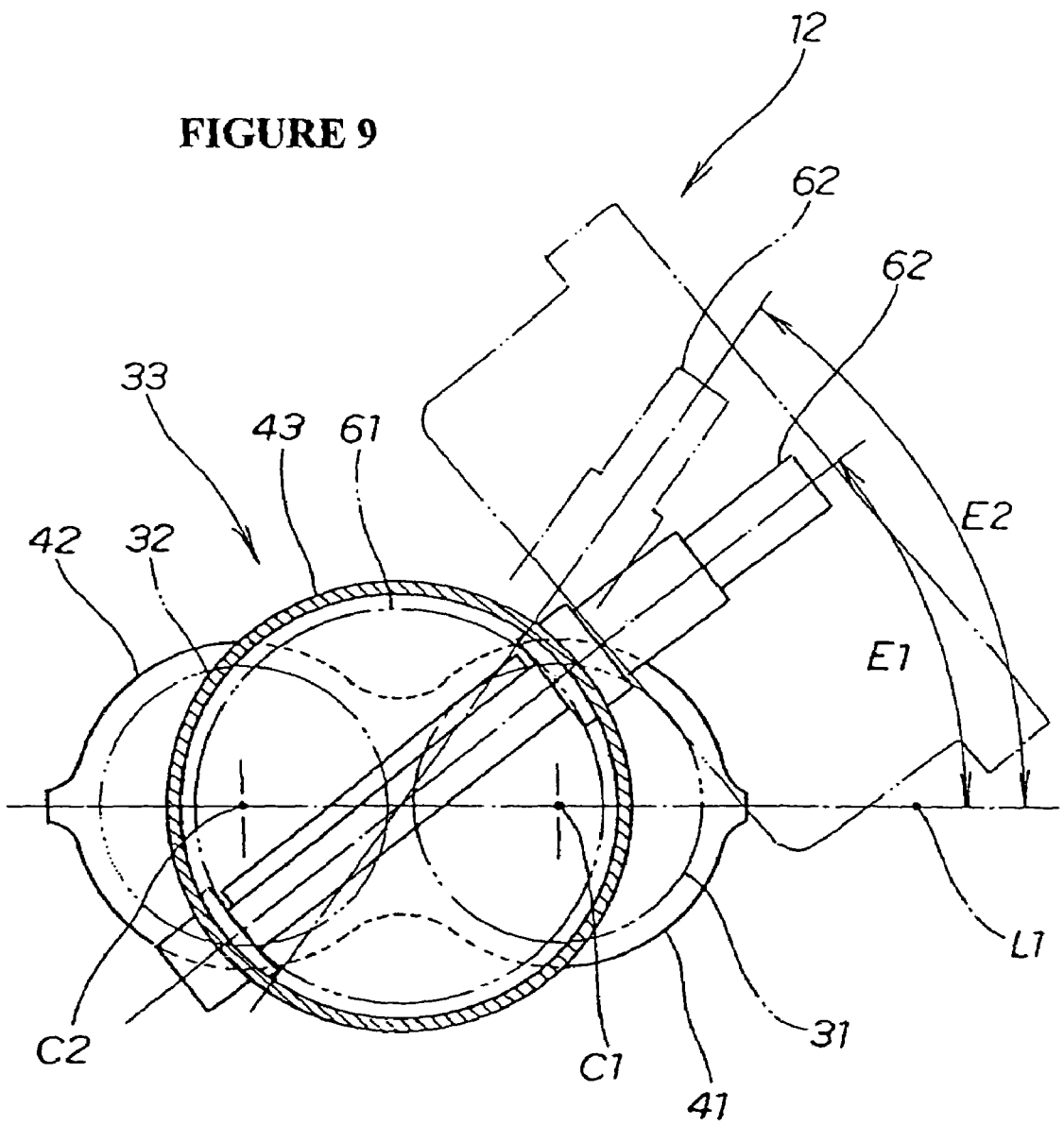
FIG. 9 is a layout view of the arrangement relationship between an exhaust pipe and an exhaust valve of the exhaust control apparatus of the motorcycle of FIG. 1, showing the angle of the valve rod relative to a line connecting the centers of the individual exhaust pipes.

FIG. 8 is a perspective view of the exhaust control apparatus of the motorcycle according to the present invention. Here, the exhaust control apparatus 11 includes an exhaust collection pipe 33 which collects a plurality of exhaust pipes, for example, first and second pipes 31, 32. The exhaust control apparatus 11 also includes an exhaust valve 12 which is mounted on the exhaust collection pipe 33 and controls a flow rate of an exhaust gas within the exhaust collection pipe 33. The exhaust control apparatus 11 includes a valve rod 62 (see FIG. 9) which forms a shaft of the exhaust valve 12 and is arranged at a position away from the centers of the plurality of exhaust pipes. In the illustrated case, valve rod 62 is arranged at a position away from the centers of both the first and second pipes 31, 32. In FIG. 9, C1, C2 indicate respective centers of the first and the second pipes and L1 indicates a straight line which connects the centers C1, C2.

For example, in arranging the exhaust valve which controls the flow rate of the exhaust gas in the exhaust passage including the exhaust pipe, it is desirable to arrange the exhaust valve such that the interruption of the flow of the exhaust gas by the exhaust valve can be reduced with the result that a smooth flow of the exhaust gas can be ensured, and the discharge efficiency is enhanced.

FIG. 9 shows the arrangement relationship of the exhaust pipe and the exhaust valve of the exhaust control apparatus of the motorcycle according to the present invention. The exhaust control apparatus 11 ensures a smooth flow of the exhaust gas and the exhaust efficiency is improved by providing the exhaust valve 12, which controls the flow rate of the exhaust gas, within the exhaust collection pipe 33, and by arranging the valve rod (shaft) 62 of the exhaust valve 12 at a position away from the centers C1, C2 of the plurality of exhaust pipes (first and second pipes) 31, 32. As a result, the ability to control the exhaust gas using the exhaust control apparatus is enhanced. In FIG. 9, reference numeral 61 indicates a valve of the exhaust valve 12 which is mounted on the valve rod (shaft) 62.

The exhaust control apparatus 11 should be understood such that when the number the plurality of exhaust pipes is set to two, the valve rod (shaft) 62 of the exhaust valve 12 can be inclined or tilted within a range of E1 to E2 (35 to 55 degrees) with respect to the straight line L1 which connects the centers of two exhaust pipes (first pipe and second pipe) 31, 32.

That is, the exhaust control apparatus 11 is formed such that when the number of the plurality of exhaust pipes is set to two, the valve rod (shaft) 62 of the exhaust valve 12 is inclined within a range of E1 to E2 (35 to 55 degrees) with respect to a straight line which connects the respective centers of the first exhaust pipe 31 and the second exhaust pipe 32. Hence, it is possible to ensure a desired height of the motorcycle 10 (see FIG. 1) above a ground and to accommodate the exhaust control apparatus 11 within a bank angle. As a result, it is possible to obtain increased freedom in placement of the exhaust control apparatus in the overall design of the motorcycle.

The detailed shape of the exhaust valve 12 is explained hereinafter in conjunction with FIG. 10 to FIG. 13.

Figure 10:
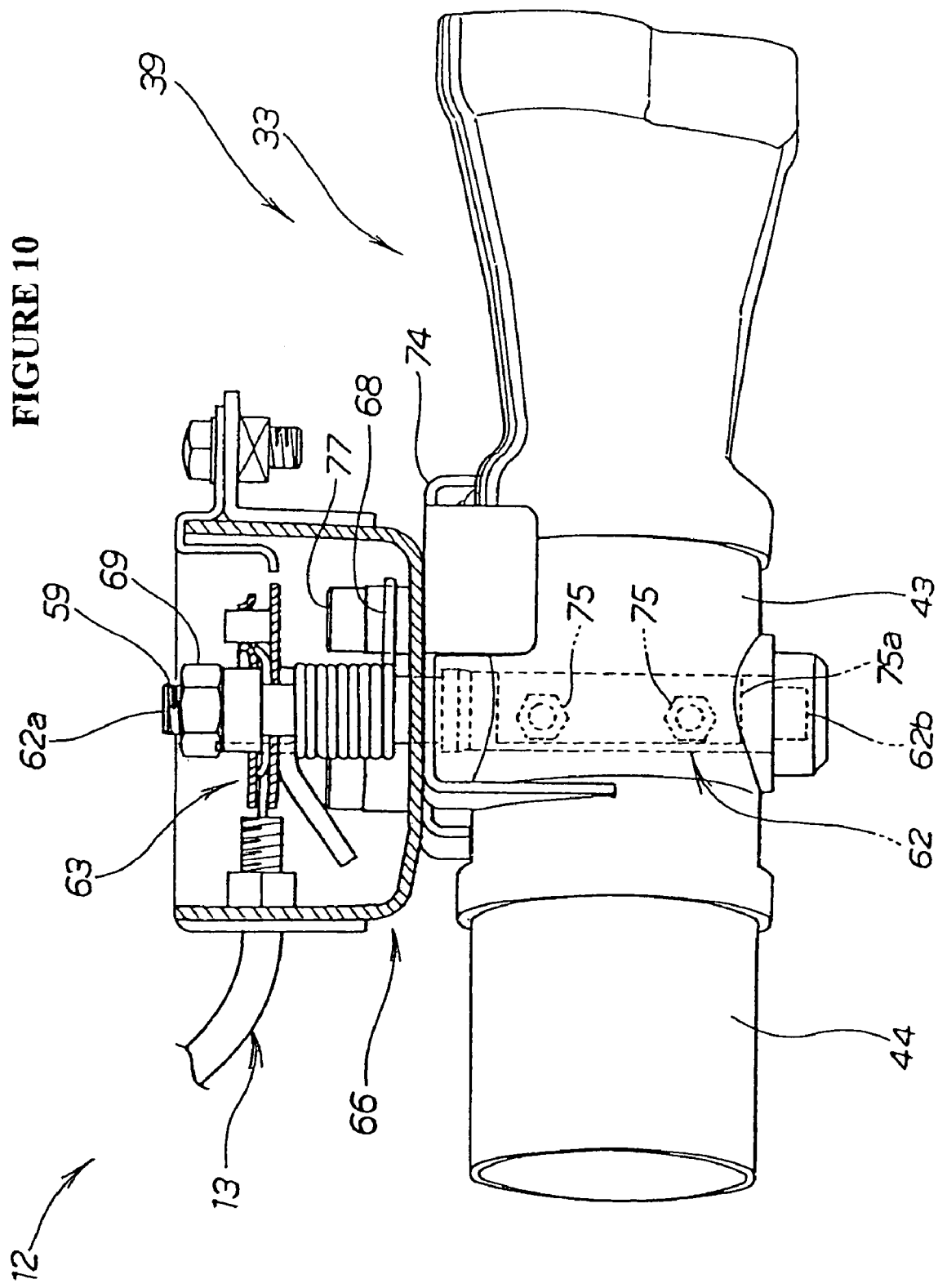
FIG. 10 is a front partial cross-sectional view of the exhaust valve of the exhaust control apparatus of the motorcycle of FIG. 1.

FIG. 10 is a front cross-sectional view of the exhaust valve of the exhaust control device of the motorcycle according to the present invention, wherein the exhaust valve 12 includes a valve plate 61 (see FIG. 9) which changes the flow rate of the exhaust gas in the exhaust pipe 39 (the exhaust collection pipe 33), and a valve rod 62 to which the valve plate 61 is mounted. The exhaust valve 12 includes a pulley 63 which rotates the valve rod 62, a casing 66 which houses the pulley 63, and a lid 67 (see FIG. 8) having the previously-mentioned mounting portion 58 which covers the casing 66. The exhaust valve 12 also includes a torsion spring 68 which is arranged in a biased manner between the casing 66 and the pulley 63, and a nut 69 which threadedly engaged with a male screw portion 59 formed in one end 62a of the valve rod 62.

In FIG. 10, numeral 62b indicates the second end of the valve rod 62, numeral 74 indicates a stay which is served for mounting the case 66, numeral 75 indicates bolts which fix the valve plate 61 (see FIG. 9) to the valve rod 62 by way of washers 75a, and numeral 77 is a locking member which locks one end of the torsion spring 68.

Figure 11:
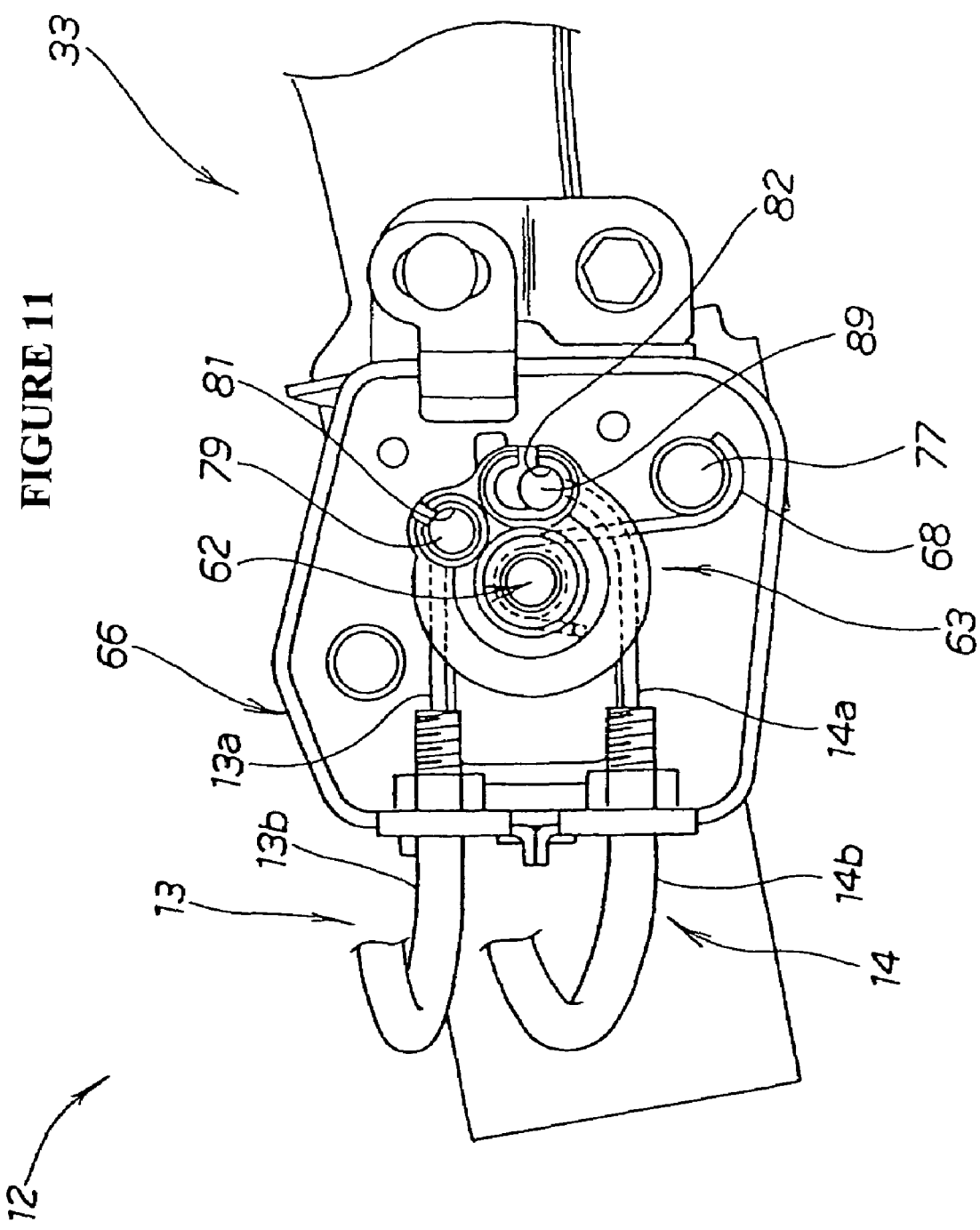
FIG. 11 is a plan view of an exhaust valve of an exhaust control apparatus of the motorcycle of FIG. 1.

FIG. 11 is a plan view of the exhaust valve of the exhaust control apparatus 11. Within casing 66, a pulley 63 is provided with a first connection portion 81 into which a cable end 79, which is fixed to a distal end of an inner cable 13a of an control cable 13, is fitted. The pully 63 is provided with a second connection portion 82 into which a cable end 89, which is fixed to the distal end of an inner cable 14a of an control cable 14, is fitted. Further, the control cables 13, 14 are engaged with an control cable holder and the control cable holder is fixed to the casing. Here, reference numerals 13b, 14b respectively indicate outer tubes of the control cables 13, 14.

Figure 12:
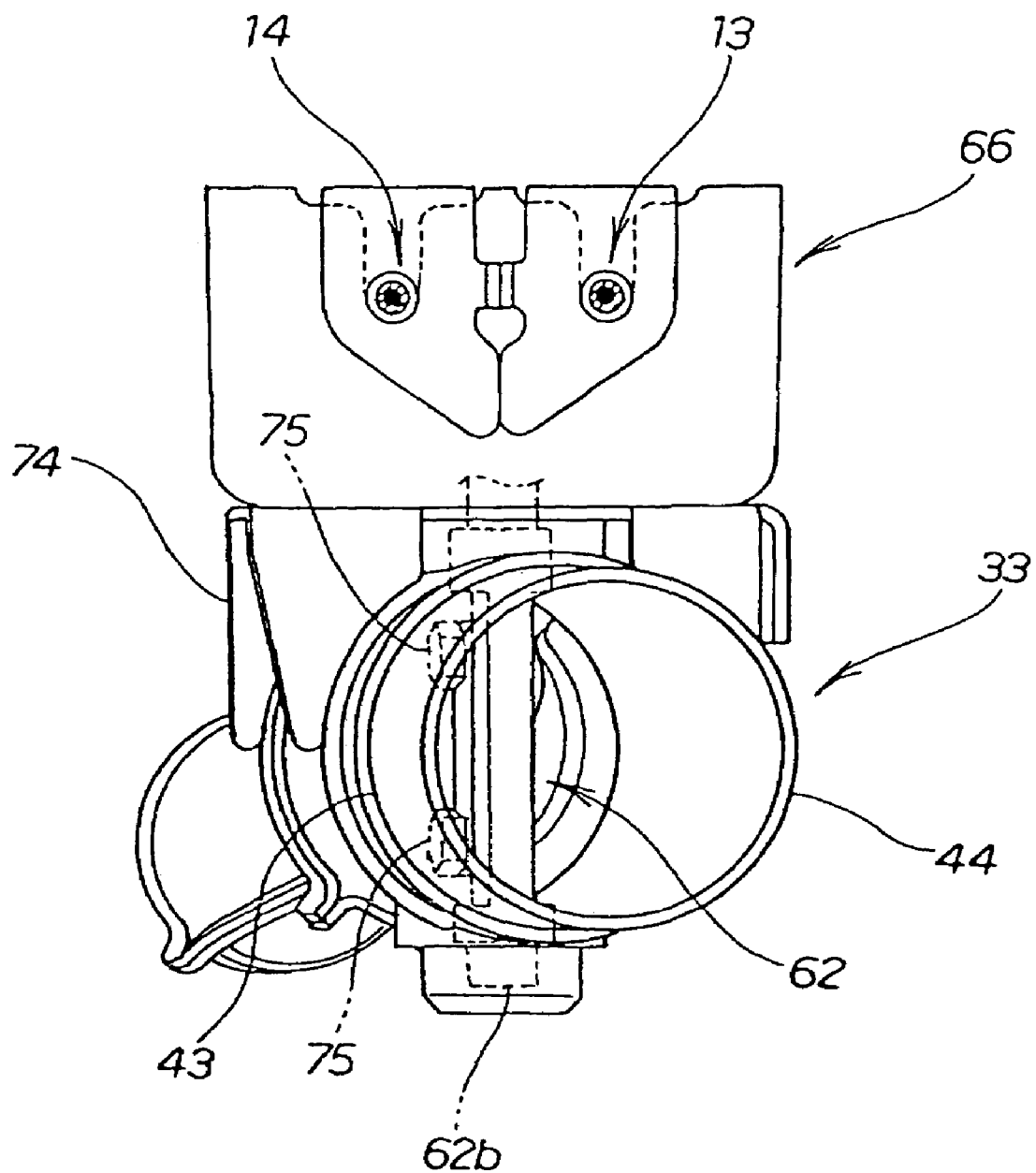
FIG. 12 is a side view of an exhaust valve of an exhaust control apparatus of the motorcycle of FIG. 1.

FIG. 12 is a side view of the exhaust valve of the exhaust control device of the motorcycle according to the present invention. With respect to the exhaust valve 12, another end 62b of the valve rod 62 is inserted into the valve mounting portion 43 of the exhaust connection pipe 33. The casing 66 is mounted on one end 62a of the valve rod 62. The pulley 63 (see FIG. 11) is mounted in the casing 66. The operation wires 13, 14 are connected to the pulley 63. By driving the operational wires 13, 14 using the servomotor 15 (see FIG. 6), the valve rod 62 is rotated and hence, the valve plate 61 (see FIG. 8), which is mounted on the valve rod 62, can be opened and closed.

Next, the manner of operation of the exhaust valve 12 of the exhaust control apparatus 11 is explained.

FIG. 13(a) and FIG. 13(b) are operation explanatory views of the exhaust control device of the motorcycle according to the present invention. FIG. 13(a) shows the exhaust valve 12 wherein the valve plate 61 is positioned in an open state. In FIG. 13(b), the servomotor 15 (see FIG. 6) is driven so as to loosen the operation wire 13 as indicated by an arrow a1, the operation wire 14 is pulled as indicated by an arrow a2, and the pulley 63 is rotated as indicated by an arrow a3 thus setting the exhaust valve 12 in a closed state.

Figure 14:
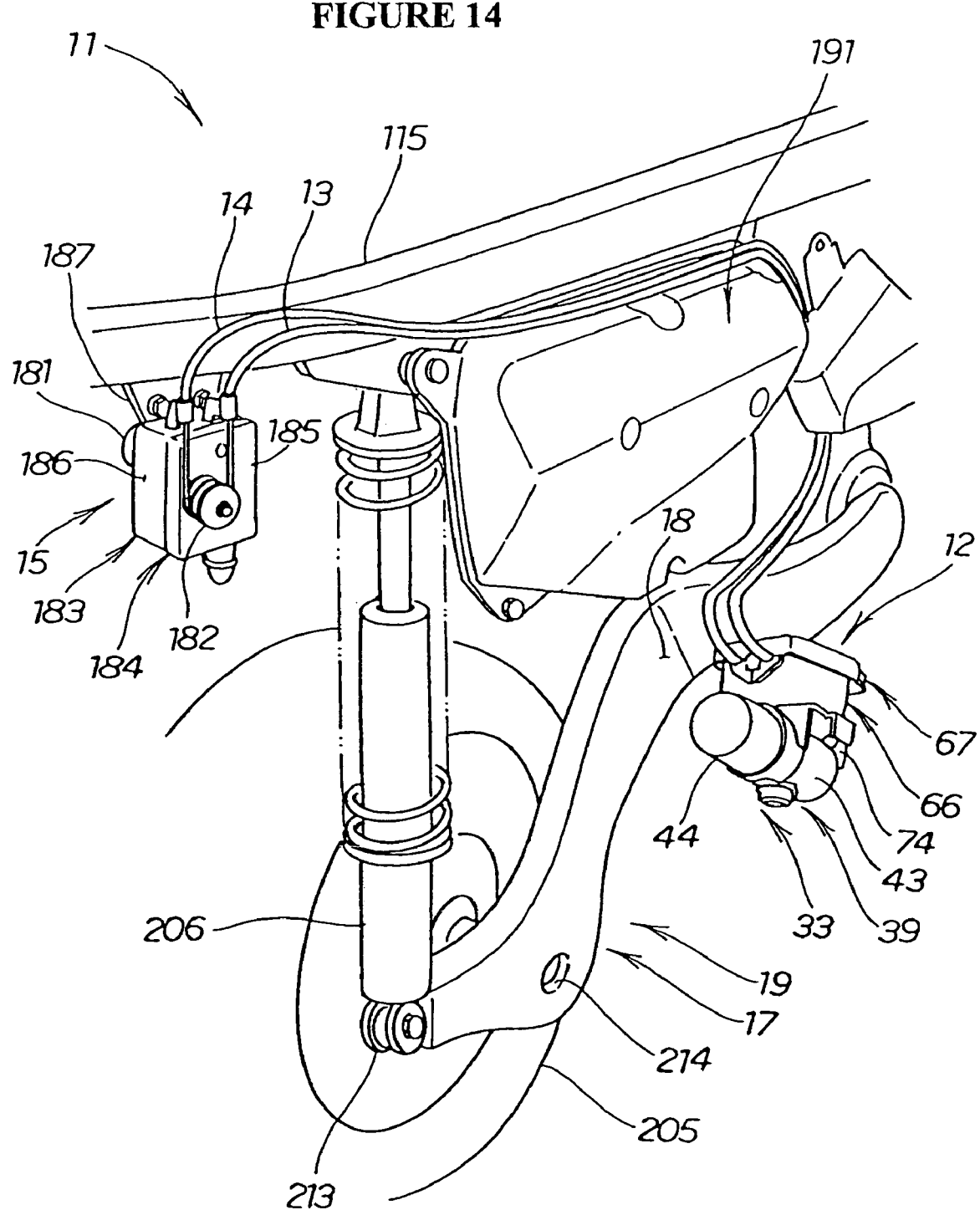
FIG. 14 is a perspective view of the exhaust control apparatus of the motorcycle of FIG. 1 as viewed from an upper rear position, illustrating the servomotor acting through operational wires to actuate the valve within the exhaust control apparatus.

FIG. 14 is a perspective view as viewed from a position behind and above the exhaust control apparatus of the motorcycle according to the present invention. The servomotor 15 includes a motor body 181, a motor-side pulley 182 which is connected to the motor body 181 by way of a gear train (not shown in the drawing), a motor casing 183 which covers the gear train, and a motor cover 184 which covers the motor casing 183. Here, reference numeral 185 indicates a front end portion of the servomotor 15, reference numeral 186 indicates a rear end portion of the servomotor, reference numeral 187 indicates a motor bracket which is provided for mounting the servo motor 15 on the left seat rail 115.

Figure 15:
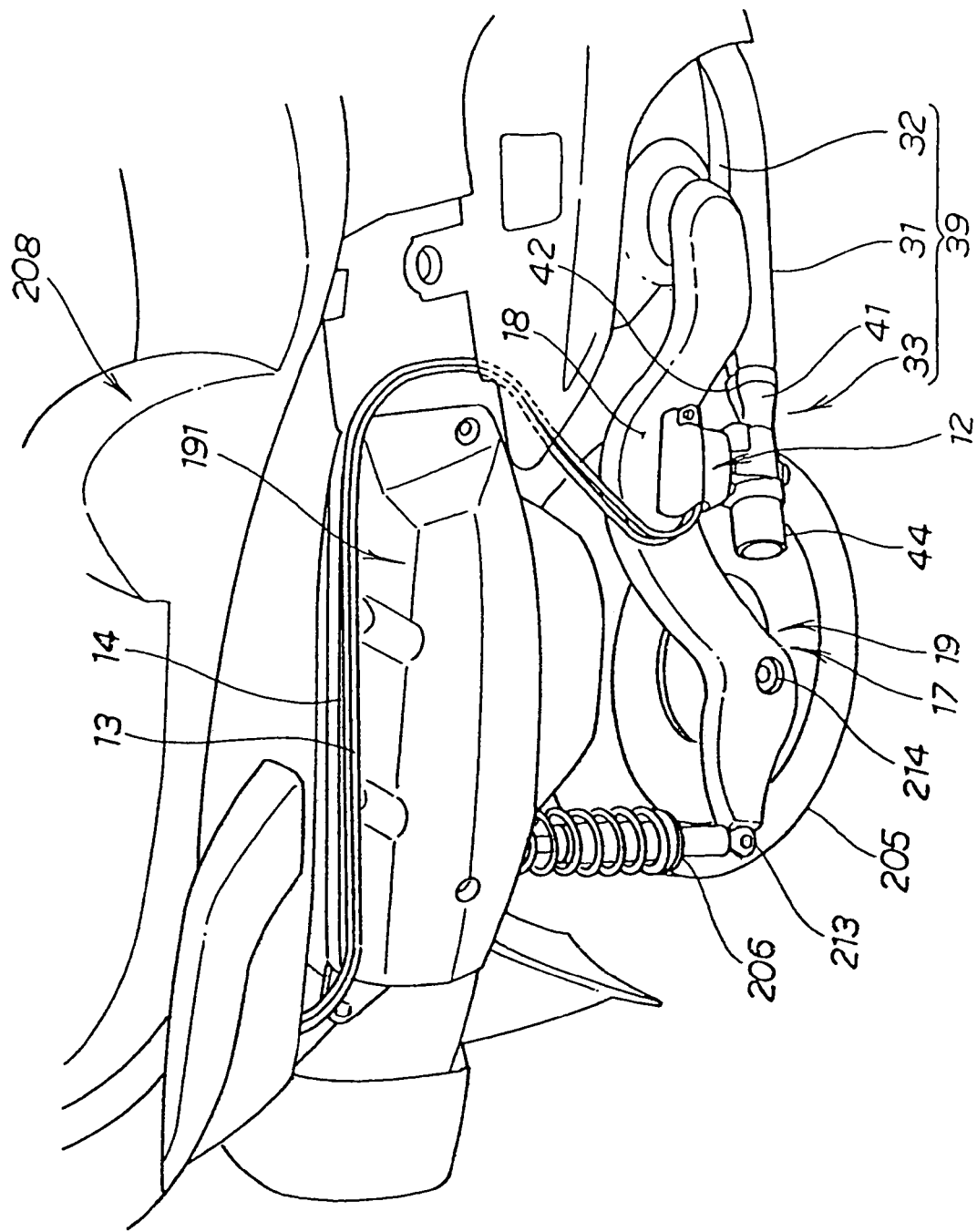
FIG. 15 is a perspective view showing a rear side of the exhaust control apparatus of the motorcycle of FIG. 1.

FIG. 15 is a perspective view which shows a rear side face of the exhaust control apparatus of the motorcycle according to the present invention. As shown in FIG. 15, in the motorcycle 10 (see FIG. 2) in which the engine 211 (see FIG. 6) is mounted on the vehicle body frame 110 (see FIG. 4), the exhaust pipe 39 is connected to the engine 211 and the muffler 34 (see FIG. 7) is mounted on the exhaust pipe 39. The exhaust valve 12, which controls the flow rate of the exhaust gas, is provided in the vicinity of the connection portion 44 between the exhaust pipe 39 and the muffler 34 as well as on the exhaust pipe 39 side.

Often a plurality of types of motorcycles which belong to the same motorcycle line are provided by mounting different mufflers on one type of motorcycle to cope with tastes of users. In this example, it is advantageous to exchange only the muffler, rather than both the muffler and the exhaust control apparatus, both in terms of improving the ease of the exchanging operation and of lowering of the cost of the exchanging operation. Accordingly, by positioning the exhaust valve 12, which controls the flow rate of the exhaust gas, in the vicinity of a connection portion 44 between the exhaust pipe 39 and the muffler 34 (see FIG. 6) and on the exhaust-pipe-39 side, it is possible to exchange the muffler 34 without influencing the exhaust valve 12. As a result, the ease of replacing the muffler is enhanced and the cost of the muffler 34 which is replaced is reduced.

Figure 16:
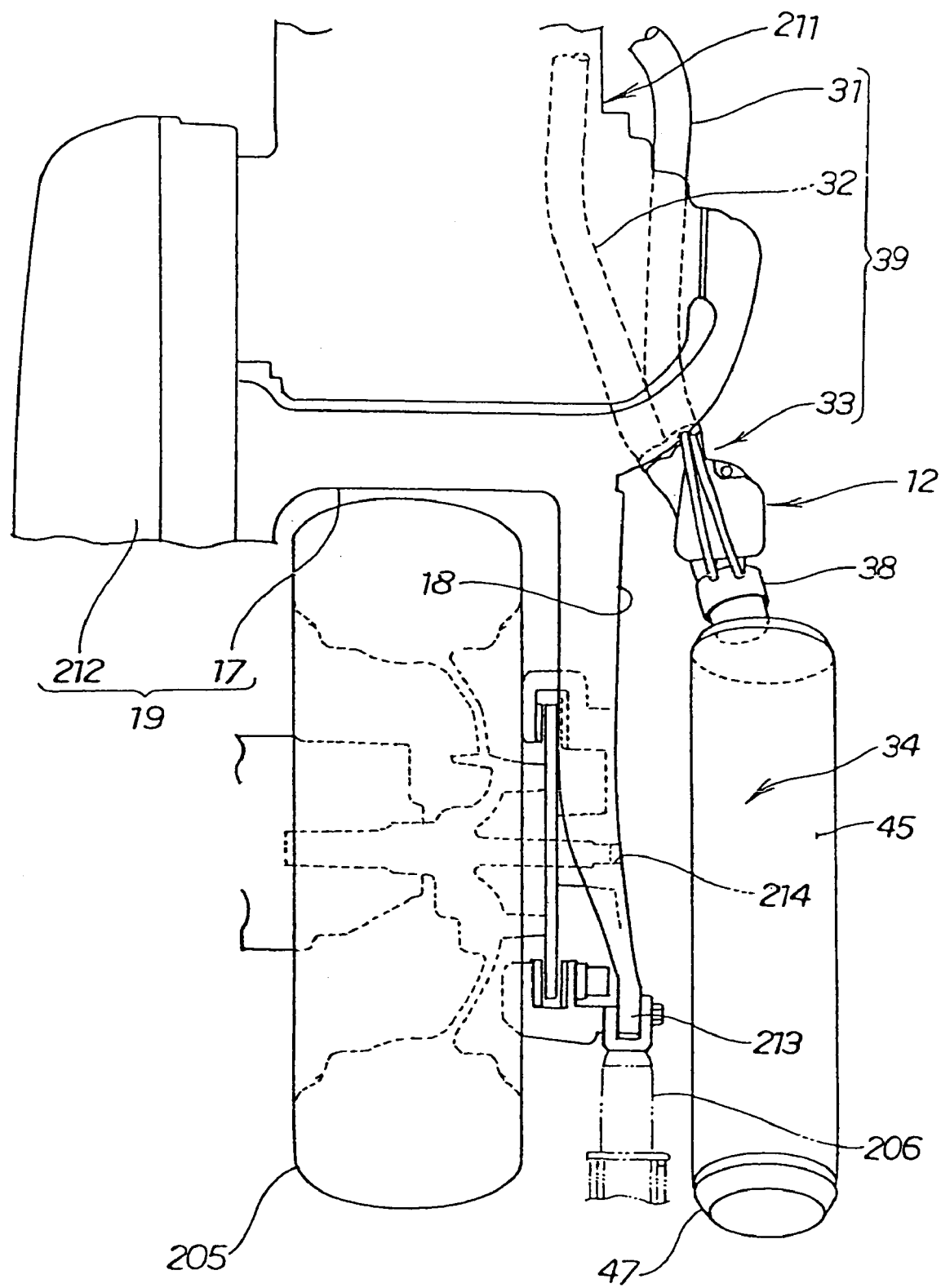
FIG. 16 is a plan view showing the arrangement relationship of a swing arm and an exhaust valve of the exhaust control apparatus of the motorcycle of FIG. 1 showing the exhaust valve positioned within a recessed portion of the swing arm.

FIG. 16 is a plan view showing the arrangement relationship of the swing arm and the exhaust valve 12 of the exhaust control apparatus 11 of the motorcycle according to the present invention. As shown in the drawing, the swing arm 19 is mounted on the vehicle body frame 110 in such a manner that the swing arm 19 can swing in the upward and downward direction. The engine 211 is mounted on the vehicle body frame 110, the exhaust pipe 39 is connected to the engine 211, and the muffler 34 is mounted on the exhaust pipe 39. The exhaust valve 12, which controls the flow rate of the exhaust gas, is provided on the exhaust pipe 39 side of muffler 34. A recessed portion 18, which extends toward the vehicle body center, is formed on a lateral face of the swing arm 19 side. The exhaust valve 12 is positioned in the vicinity of the recessed portion 18 so as to face the recessed portion 18.

It is desirable from a viewpoint of efficient utilization of a layout space to position the exhaust valve 12 on the exhaust pipe without widening the vehicle width. That is, by forming the recessed portion 18 in the swing arm 19 and making the exhaust valve 12 face the recessed portion 18, the exhaust valve 12 can positioned adjacent to the body center side. Hence, the exhaust valve 12 of the exhaust control apparatus 11 (see FIG. 6) can be arranged on the exhaust pipe 39 without widening the vehicle width.

Further, by also making the control cables 13, 14 which operate the exhaust valve 12 face the recessed portion 18 side, the control cables 13, 14 can be pulled out from the exhaust valve 12 while preventing the control cables 13, 14 from projecting to the outside beyond the vehicle width.

Figure 17:
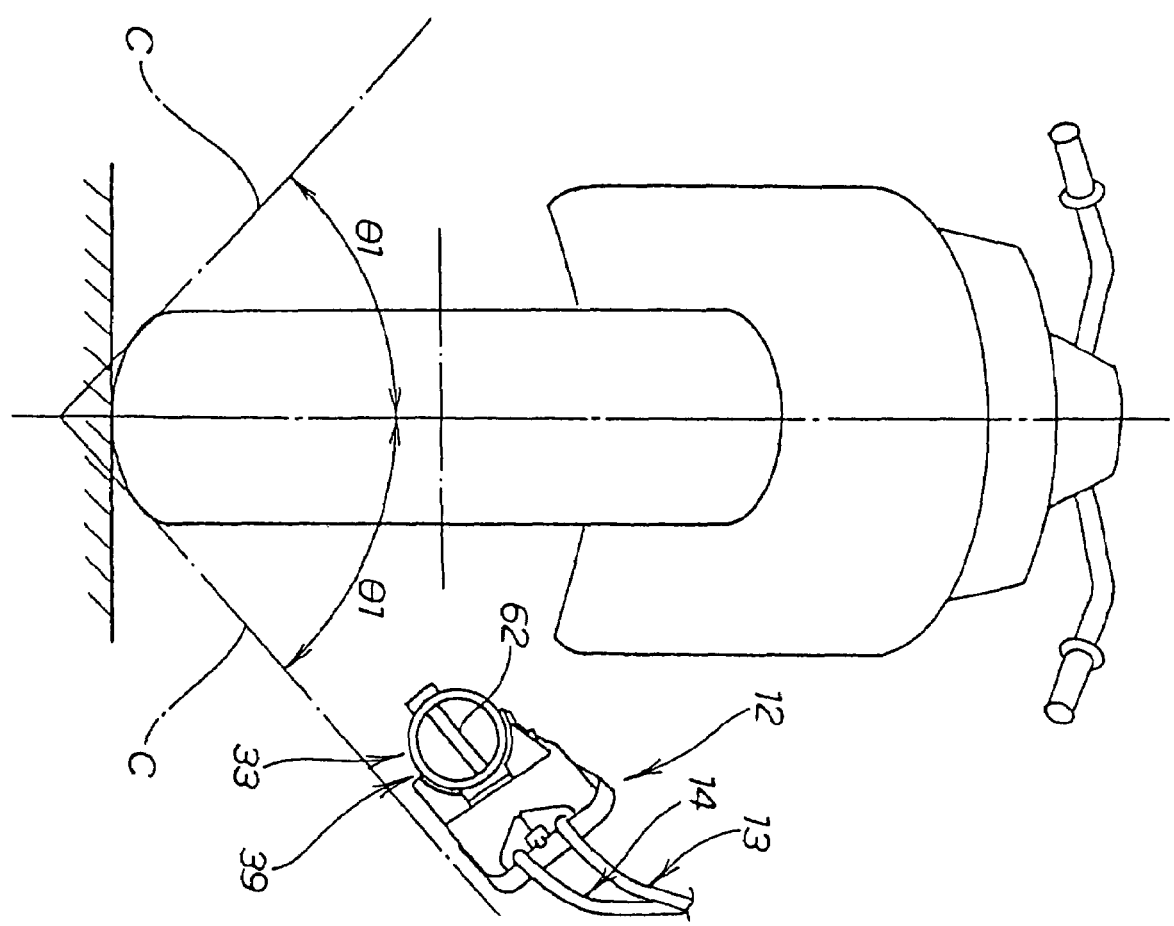
FIG. 17 is an explanatory view for explaining a mounting angle of the exhaust valve of the exhaust control apparatus of the motorcycle of FIG. 1 wherein the maximum allowable bank angle $\theta_1$ is illustrated.
Figure 18:
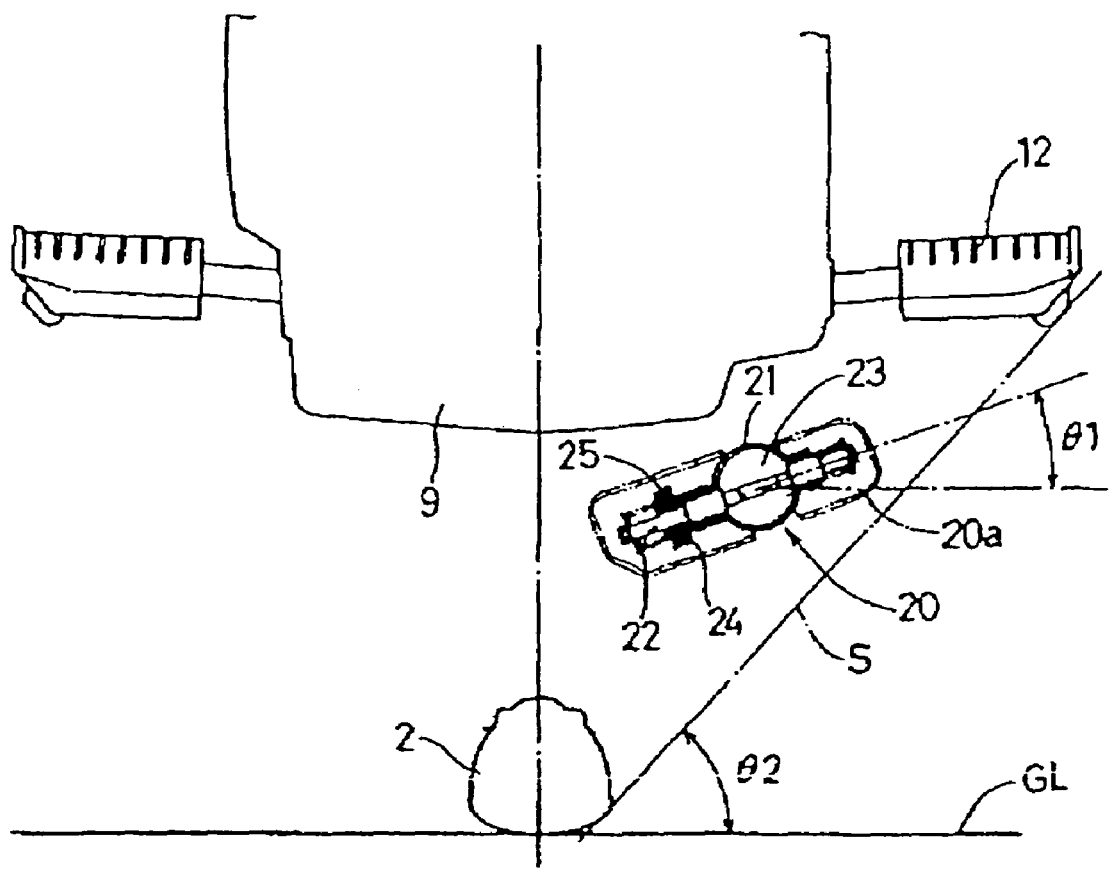
FIG. 18 is a reproduction of a prior art exhaust valve, included for purposes of explanation.

FIG. 17 is an explanatory operational view for showing a mounting angle of the exhaust valve of the exhaust control apparatus of the motorcycle according to the present invention. When mounting the exhaust valve 12 on the exhaust pipe 39, whether a height of the motorcycle above a ground is sufficiently ensured or not and whether the control cables can be easily pulled out or not are matters to be taken into consideration. Here, assuming an angle by which the motorcycle body can be fully inclined in the vehicle width direction as a maximum allowable bank angle θ1, the valve rod (shaft) 62 of the exhaust valve 12 is arranged so as to be approximately parallel to the ground surface C when the body is inclined at the maximum allowable bank angle θ1.

By arranging the valve rod (shaft) 62 of the exhaust valve 12 approximately parallel to the ground surface C when the body is inclined at the maximum allowable bank angle θ1, it is possible to suppress the projection of the exhaust valve 12 and to arrange the exhaust valve 12 within the maximum allowable bank angle and, at the same time, the control cables 13, 14 (the control cable 14 at a depth side not shown in the drawing) can be easily pulled out from the exhaust valve.

Here, as shown in FIG. 7, although the exhaust pipe 39 includes two pipes 31, 32 and the exhaust collection pipe 33, the present invention is not limited to such a construction and the exhaust pipe 39 may be formed of only one pipe or the exhaust pipe 39 may be formed such that two pipes are connected to a first exhaust collection pipe and two other pipes are connected to a second exhaust collection pipe and a connection pipe which connects these first and second collection pipes is provided.

That is, in the exhaust pipe, the number of the pipes which extend from the cylinders of the engine is arbitrary and, further, the connection of the pipes is also arbitrary provided that the exhaust valve which controls the flow rate of the exhaust gas is formed in the vicinity of the connection portion between the exhaust pipe and the muffler, and on the exhaust pipe side.

Here, as shown in FIG. 1, although the invention has been described by adopting the motorcycle 10 as the vehicle, the vehicle is not limited to a two-wheel vehicle and the vehicle may be a four-wheel vehicle or a tricycle.

The exhaust control apparatus for a motorcycle according to the present invention is preferably adopted by the motorcycle which mounts a multi-cylinder engine thereon.

Although the present invention has been described herein with respect to an illustrative embodiment, the foregoing description is intended to be illustrative, and not restrictive. Those skilled in the art will realize that many modifications of the embodiment could be made which would be operable. All such modifications which are within the scope of the claims are intended to be within the scope and spirit of the present invention.

We claim:

1. An exhaust control apparatus for a vehicle, said exhaust control apparatus comprising:
   a collection pipe for collecting exhaust gas from a plurality of exhaust pipes; and
   an exhaust valve operatively connected to the collection pipe and comprising a shaft and a single valve plate attached to the shaft;
   wherein the exhaust valve is operable to control a flow of exhaust gas through the collection pipe, and
   wherein the shaft of the exhaust valve is situated at a position displaced from the respective centers of the plurality of exhaust pipes,
   wherein the plurality of exhaust pipes comprises two exhaust pipes arranged laterally side-by-side, and the shaft of the exhaust valve is inclined at an angle with respect to a straight line which connects respective axial center lines of the two exhaust pipes, in a manner such that the shaft does not intersect said axial center lines,
   and wherein the plate is sized and shaped to substantially fully obstruct the collection pipe when the exhaust valve is in a closed position.

2. An exhaust control apparatus for a vehicle according to claim 1, wherein the shaft of the exhaust valve is inclined at an angle within a range of 35 to 55 degrees with respect to the straight line.

3. An exhaust control apparatus for a vehicle according to claim 1, further comprising a servomotor connected to the shaft of the exhaust valve using control cables, wherein the shaft of the exhaust valve is actuated by the servomotor.

4. An exhaust control apparatus for a vehicle according to claim 3 wherein the servomotor is mounted to the vehicle at a location spaced apart from the exhaust valve.

5. A vehicle, comprising:
   the exhaust control apparatus according to claim 1, and
   a frame having a laterally outward side face with a recess formed therein;
   wherein the exhaust valve is fixedly connected to the collection pipe;
   and wherein the collection pipe is mounted to the frame such that the collection pipe and exhaust valve lie within the recess formed in the laterally outward side face of the frame, so as to reduce the total width of the vehicle.

6. An exhaust control apparatus for a vehicle according to claim 1, wherein the exhaust valve is oriented such that when the apparatus is attached to a motorcycle, the shaft of the exhaust valve is generally parallel to the ground surface when a body of the motorcycle is oriented at a specific banked angle.

7. An exhaust control apparatus for a vehicle according to claim 1, wherein the single plate is disposed within the collection pipe at a location spaced apart from the exhaust pipes by a distance that corresponds to at least a radius of the collection pipe, such that the single plate is adapted to control gas flow within the collection pipe at a location downstream of the exhaust pipes.

8. An exhaust control apparatus for a vehicle, the exhaust control apparatus comprising a plurality of exhaust pipes, a collection pipe and an exhaust valve, wherein
   the collection pipe is adapted to be positioned downstream of the plurality of exhaust pipes for collecting exhaust streams from each of the plurality of exhaust pipes and for joining the streams into a single exhaust stream;
   wherein the exhaust valve is operatively connected to the collection pipe to control flow of the exhaust stream within the collection pipe;
   wherein the plurality of exhaust pipes comprises two exhaust pipes arranged laterally side-by-side, and the shaft of the exhaust valve is inclined at an angle with respect to a straight line which connects respective axial center lines of the two exhaust pipes, and wherein the exhaust valve comprises a cylindrical pipe and a single butterfly valve disposed within the pipe, the butterfly valve sized and shaped to substantially fully obstruct the collection pipe when the exhaust valve is in a closed position, the butterfly valve being mounted on a valve shaft oriented at an axial alignment that is displaced from the respective centers of each of the plurality of exhaust pipes.

9. An exhaust control apparatus for a vehicle according to claim 8, wherein the valve shaft is inclined at an angle within a range of 35 to 55 degrees with respect to the straight line.

10. A vehicle, comprising:

the exhaust control apparatus according to claim 8, and a frame having a laterally outward side face with a recess formed therein;

wherein the exhaust valve is fixedly connected to the collection pipe;

and wherein the collection pipe is mounted to the frame such that the collection pipe and exhaust valve lie within the recess formed in the laterally outward side face of the frame, so as to reduce the total width of the vehicle.

11. An exhaust control apparatus for a vehicle according to claim 8, wherein the exhaust valve is oriented such that when the apparatus is attached to a motorcycle, the shaft of the exhaust valve is generally parallel to the ground surface when a body of the motorcycle is oriented at a specific banked angle.

12. An exhaust control apparatus for a vehicle, said exhaust control apparatus comprising:

plural exhaust pipes;

a muffler;

an exhaust valve; and a collection pipe for collecting exhaust gas from the plurality of exhaust pipes, the collection pipe comprising a first end, the first end comprising plural branches for interconnection with the respective plural exhaust pipes the plural branches merging into a single passage, a second end configured to operatively interconnect with the muffler, and a valve mounting portion upon which the exhaust valve is mounted, the valve mounting portion disposed between the single passage and the second end; wherein the exhaust valve is operable to control a flow of exhaust gas through the collection pipe and comprises a shaft and a plate attached to the shaft, and the shaft is oriented within the collection pipe such that the shaft does not intersect respective axial center lines of the plurality of exhaust pipes.

13. The exhaust control apparatus of claim 12 wherein the plate is sized and shaped to substantially fully obstruct exhaust gas flow in the collection pipe when the plate is in a closed position.

14. A motorcycle, the motorcycle comprising a vehicle body frame, the vehicle body frame comprising:

two exhaust pipes;

a collection pipe which collects the two exhaust pipes;

an exhaust valve which controls a flow rate of an exhaust gas to the collection pipe, and which includes a valve shaft and a valve plate attached to the valve shaft; and a swing arm mounted on the vehicle body frame, the swing arm comprising a recessed portion, wherein the valve shaft is inclined at an angle with respect to a straight line which connects respective axial center lines of the two exhaust pipes in a manner such that it does not intersect said straight line, and a portion of the exhaust valve is arranged such that it faces the recessed portion of the swing arm.

15. The motorcycle according to claim 14, wherein the valve shaft is inclined within a range of 35 to 55 degrees with respect to the straight line which connects the respective axial center lines of the two exhaust pipes.

16. The motorcycle according to claim 14, wherein the recessed portion extends toward the vehicle body center.

17. The motorcycle according to claim 14, wherein the swing arm is mounted on the vehicle body frame in such a manner that the swing arm can swing in the upward and downward direction.

18. The motorcycle according to claim 14, wherein the motorcycle further comprises an engine and an exhaust structure, the exhaust structure comprising the two exhaust pipes and the collection pipe, and wherein the engine is mounted on the vehicle body frame, and the exhaust structure is connected to the engine.

19. The motorcycle according to claim 18, wherein the motorcycle further comprises a muffler, and wherein the muffler is mounted to the exhaust structure.

20. The motorcycle according to claim 18, wherein the exhaust valve is provided in the vicinity of a connection portion between the exhaust structure and the muffler.

21. The motorcycle according to claim 18, wherein the exhaust valve controlling the flow rate of exhaust gas is provided on a side of the exhaust structure.

22. The motorcycle according to claim 14, wherein operation wires are provided which operate the exhaust valve, whereby the operation wires are arranged such that they face the recessed portion.

* * * * *